United States Patent
Bartkowiak

(10) Patent No.: US 6,665,350 B1
(45) Date of Patent: Dec. 16, 2003

(54) METHOD AND SYSTEM FOR IMPROVED ANALOG SIGNAL DETECTION

(75) Inventor: John G. Bartkowiak, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/160,484

(22) Filed: Sep. 25, 1998

(51) Int. Cl.[7] .............................................. H04L 27/10
(52) U.S. Cl. ..................... 375/275; 375/324; 375/335; 375/349; 379/88.19; 379/88.24; 379/93.28; 379/142.18; 379/283; 379/339; 455/157.1; 455/227
(58) Field of Search ................................ 375/316, 324, 375/335, 341, 349, 275, 216, 222; 379/339, 349, 27.08, 88.12, 88.19–88.21, 88.24, 93.26, 93.28, 142.04, 142.08, 142.18, 283; 455/134, 135, 154.1, 157.1, 226.2, 227

(56) References Cited

U.S. PATENT DOCUMENTS

| | | | |
|---|---|---|---|
| 5,251,256 A | | 10/1993 | Crowe et al. |
| 5,353,344 A | * | 10/1994 | Knitsch ...................... 379/283 |
| 5,477,465 A | | 12/1995 | Zheng |
| 5,644,634 A | * | 7/1997 | Xie et al. .................... 379/386 |
| 5,818,929 A | * | 10/1998 | Yaguchi ...................... 379/283 |
| 5,862,212 A | * | 1/1999 | Mathews ...................... 379/257 |
| 5,995,557 A | * | 11/1999 | Srinivasan .................... 375/316 |
| 6,370,244 B1 | * | 4/2002 | Felder et al. ................ 379/283 |
| 6,370,555 B1 | * | 4/2002 | Bartkowiak .................. 708/311 |

* cited by examiner

*Primary Examiner*—Stephen Chin
*Assistant Examiner*—Dac V. Ha
(74) *Attorney, Agent, or Firm*—Zagorin, O'Brien & Graham, LLP

(57) ABSTRACT

A method and system for improved detection of analog signals, where the analog signals may be composed of one or more analog frequencies. In the method and system, an analog signal is received. A stream of data samples is created from the analog signal. Based on the stream of data samples, a confidence factor regarding the presence of the one or more analog signals is created. The confidence factor is created based upon a confidence factor calculated for each of the one or more analog frequency signals. The confidence factor calculated for each of the one or more analog frequency signals is calculated utilizing incremental energies associated with each of the one or more analog frequency signals.

29 Claims, 20 Drawing Sheets

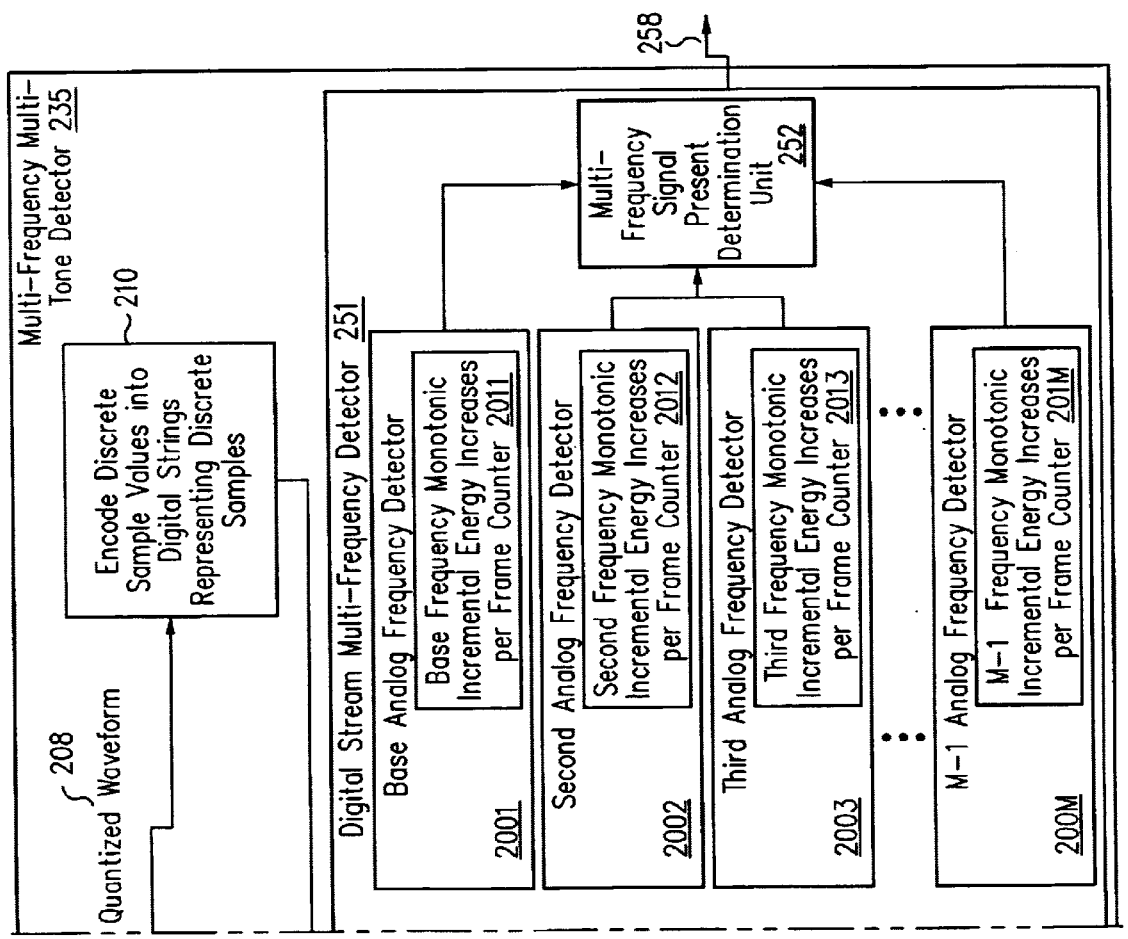

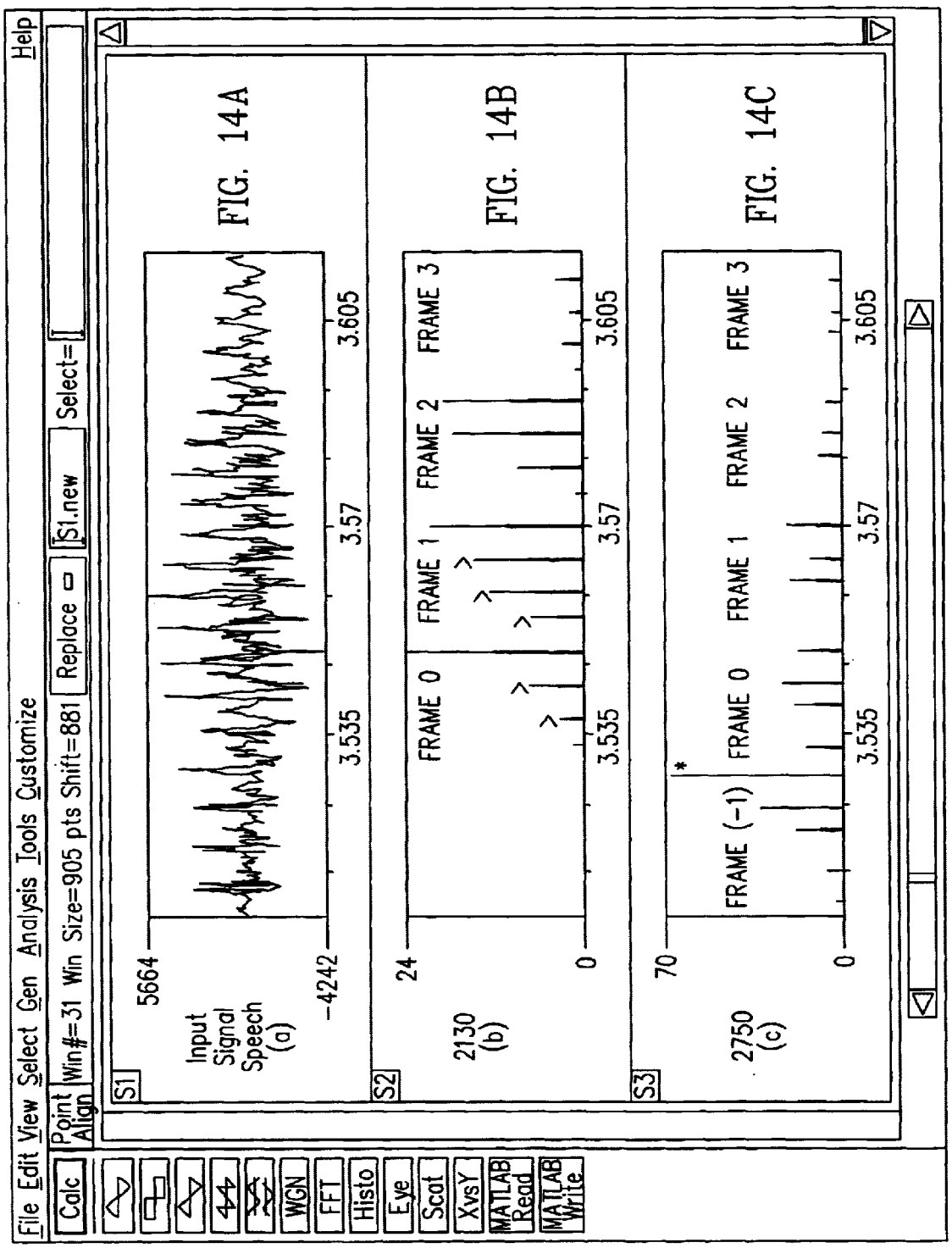

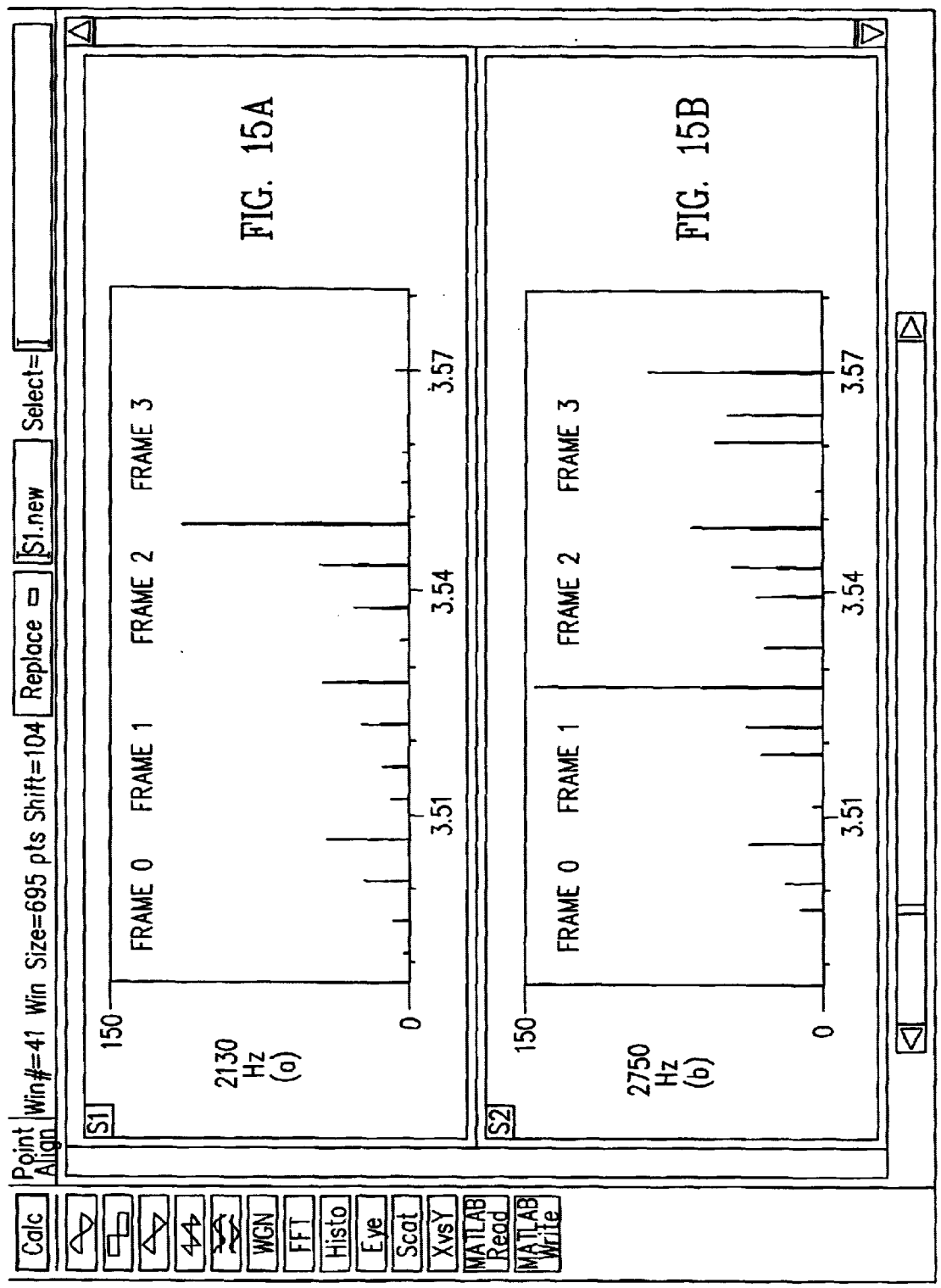

METHOD AND SYSTEM FOR IMPROVED ANALOG SIGNAL DETECTION

BACKGROUND OF THE INVENTION

1. Field of the Invention

The present invention relates to analog communication systems. In particular, the present invention relates to analog communication systems, such as telephony systems, wherein analog control signals are sent in voice band.

2. Description of the Related Art

An analog communication system is a communication system wherein information is transmitted as a continuous-time signal. One such analog communication system is an analog telephony system.

Within analog telephony systems, it is necessary for communication system control information to be transmitted between communications devices. Such information can be used to control switching, to alert a telephone user that he or she has a call waiting, or to display caller identification information. One way in which such control information is transmitted within telephony systems is referred to as "in-band signaling."

In an analog telephony system, analog electrical signals utilized within the telephony system are directly translated to mechanical signals of identical frequencies by use of a transducer such as a telephone speaker. The mechanical signals from the speaker are perceived as sound "tones" by a human telephone user. The electrical signal frequencies which directly translate to mechanical signals (tones) which humans can hear are referred to as "voice band" frequencies, since what a human usually hears over a telephone is the human voice.

When control information signals are sent in the range of electrical frequencies which will translate to tones humans can hear, such signaling is referred to as "voice-band" or "in-band signaling." One specific scheme in which this is currently done is known as Dual Tone Multi-Frequency (DTMF) signaling. "Dual Tone" implies that any two frequencies used will be in-band, Multi-Frequency implies that more than one frequency per tone is possible.

A problem which commonly occurs when in-band signaling tones, single or multiple, are used to transmit information, is the accurate estimation of the time duration for which the signal is present. For example, in DTMF tones used in standard telephony applications for push-button signal reception, signal durations in the range 20–40 ms are specified as the minimum-to-maximum requirement in various National and International Standards. Outside this range, the signal can be accepted or rejected as a true signaling tone, depending upon the accuracy of measurement specified by a particular Communications Administration.

The current trend is for more and more information to be conveyed via DTMF signals. A relatively recent example of such increase in information to be conveyed via tone detection is the group of services known as Caller Identity Deliver on Call Waiting (CIDCW) which provides caller identity information to the subscriber for calls that are call waited.

As more and more information is conveyed via DTMF signals, the allowable signal tolerances are dropping. That is, system performance requirements are rising. One example of such rising performance requirements is set forth in Bellcore Special Report SR-TSV-002476, Issue 1, December 1992 which sets forth a series of six very stringent performance criteria, all of which must be passed for DTMF systems to be deemed "Bellcore Standard Compliant."

One set of "Bellcore Standard Compliant" performance criteria relates to tone detection. A Bellcore Compliant system must be able to detect tones within a very narrow frequency tolerance, and a tightly controlled time window. For example, for the two DTMF tones 2130 Hz and 2750 Hz, the Bellcore performance criteria are as follows: Lower Tone: 2130 Hz+/–0.5%; Upper Tone: 2750 Hz+/–0.5%; Dynamic Range: –14 to –32 dBm per tone; Power Differential within Dynamic range: 0 to 6 dB between tones. The specified duration for the DTMF signal to be accepted as a control signal by Customer Premises Equipment must fall within a time window 75 to 85 ms duration.

Detection of such signals in environments where noise or speech is present is generally recognized to be a complex issue. One such complexity involves the issues of talk-off and talk-down.

Talk-off occurs whenever a signal tone detector erroneously accepts signal imitations, such as those produced by speech or music, as valid DTMF signals. These signals can imitate some of the temporal and spectral characteristics of DTMF signaling tones. These imitations are likely to trigger, or "talk-off"—the "talk" setting "off", signal detectors. An important goal in designing such detectors is making them immune to these signal imitations.

Talk-down occurs whenever a signal detector erroneously rejects valid DTMF signaling signals due to the presence of competing speech, music or other extraneous background noise. The existence of these complex signals introduces spectral components into the signal that distort and ultimately impair the detection of valid DTMF signaling tones. This is analogous to a situation in which a person is "talked down" by another person shouting at him or her, thus this situation is referred to in the art as "talk-down". A signal detector is said to have been "talked down" whenever it fails to recognize valid signaling tones that were masked by speech, music, or noise.

One group of services known as Caller Identity Deliver on Call Waiting (CIDCW) requires reliable signaling in an adverse signaling environment. The essence of this service is to provide caller identification information to the subscriber for calls that are call waited.

Imagine that two parties, a near-end and a far-end party, have a connection established between them. Suppose that the near-end party subscribes to CIDCW. Further suppose that a third party attempts to call the near-end party. Upon completion of dialing the near-end party's number, the third party receives audible ringing. The Central Office (CO) switch recognizes that a call is destined for the near-end party and starts to execute the CIDCW service routine. The switch splits the connection and, in consequence, mutes the far-end party. It sends the regular call waiting signal, a burst of about 300 msec of a 440 Hz tone, to the near-end party and it appends to this call waiting signal a short burst of a special alerting signal, a Customer Premises Equipment Alerting Signal (CAS) which is intended to prompt the near-end party's equipment. This equipment must reliably detect this alerting signal. Upon reception, the subscriber's handset and any other parallel extension handset is muted, an acknowledgment signal is sent back to the CO and the subscriber's equipment places a Frequency Shift Keying (FSK) data receiver on the line awaiting the caller identification information. The near-end party's equipment then receives the data, decodes the information and displays it for the subscriber to view. The connection between the near- and far-end party is then re-established once data transmission is complete.

It can be seen that the degree to which this service works depends on the accuracy with which the alerting signal is detected by the subscriber's equipment. Since the signaling scheme chosen for this service was in band dual tone signaling, the problems of talk-off and talk-down are now relevant where the consequences of failure can be as follows.

A first consequence relating to talk-off is that if the subscriber's detector is talked off and incorrectly accepts a signal imitation produced by speech, the Customer Premises Equipment (CPE) will interrupt the connection by muting the handset, and any extension handsets, and will send back an acknowledgment signal at a relatively high amplitude in comparison to what the subscriber would normally hear on the line. The connection between the near-end and the far-end will remain interrupted until the CPE times out waiting for data. Since the CO did not originate the alerting signal, the far-end party will unintentionally receive the acknowledgment signal at an undesirable listening level.

Alternatively, a second consequence relating to talk-down is that if the CPE is talked down and fails to recognize an alerting signal sent by the CO, no caller identification information will be delivered and the service paid for by the subscriber will not be rendered.

In both cases, detector failure degrades the quality of the service. Thus, since both talk-off and talk-down have negative consequences, the presence of such occurrences must be minimized. Also, because the alerting signal can be sent at any time while the near-end and far-end parties are connected, the CAS detector must remain on the line for the entire duration of the call. Therefore, during this time, the detector is constantly exposed to speech with the consequent possibility of talk-off. Since talk-off degrades the voice path, repeated talk-offs in relatively short time periods should be avoided.

As has been discussed, the phenomena of talk-off and talk-down have deleterious effects upon communication efficiency. As has also been discussed, the cause of the talk-off and talk-down phenomena is the inability to accurately the detect the presence of DTMF signals in a noisy environment. It is therefore apparent that a need exists for a method and system which will substantially maximize the detection of dual tone multi-frequency signals, particularly in an environment where other signals, such as music, speech, data, and noise can be simultaneously present with the dual tone multi-frequency signals.

SUMMARY OF INVENTION

It has been discovered that a method and system can be produced which will substantially maximize the detection of dual tone multi-frequency signals, particularly in an environment where other signals, such as music, speech, data, and noise can be simultaneously present with the dual tone multi-frequency signals. In the method and system, an analog signal is received. A stream of data samples is created from the analog signal. Based on the stream of data samples, a confidence factor regarding the presence of the one or more analog signals is created. The confidence factor is created based upon a confidence factor calculated for each of the one or more analog frequency signals. The confidence factor calculated for each of the one or more analog frequency signals is calculated utilizing incremental energies associated with each of the one or more analog frequency signals.

The foregoing summary is illustrative and is intended to be in no way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIGS. 14A, 14B and 14C are screen captures of a simulation of an embodiment of the present invention.

FIGS. 15A and 15B are screen captures of a simulation of an embodiment of the present invention.

The use of the same reference symbols in different drawings indicates similar or identical items.

DESCRIPTION OF THE PREFERRED EMBODIMENTS

The following sets forth a detailed description of the best contemplated mode for carrying out the invention as described in the claims. The detailed description is intended to be illustrative and should not be taken as limiting.

Figure 1:
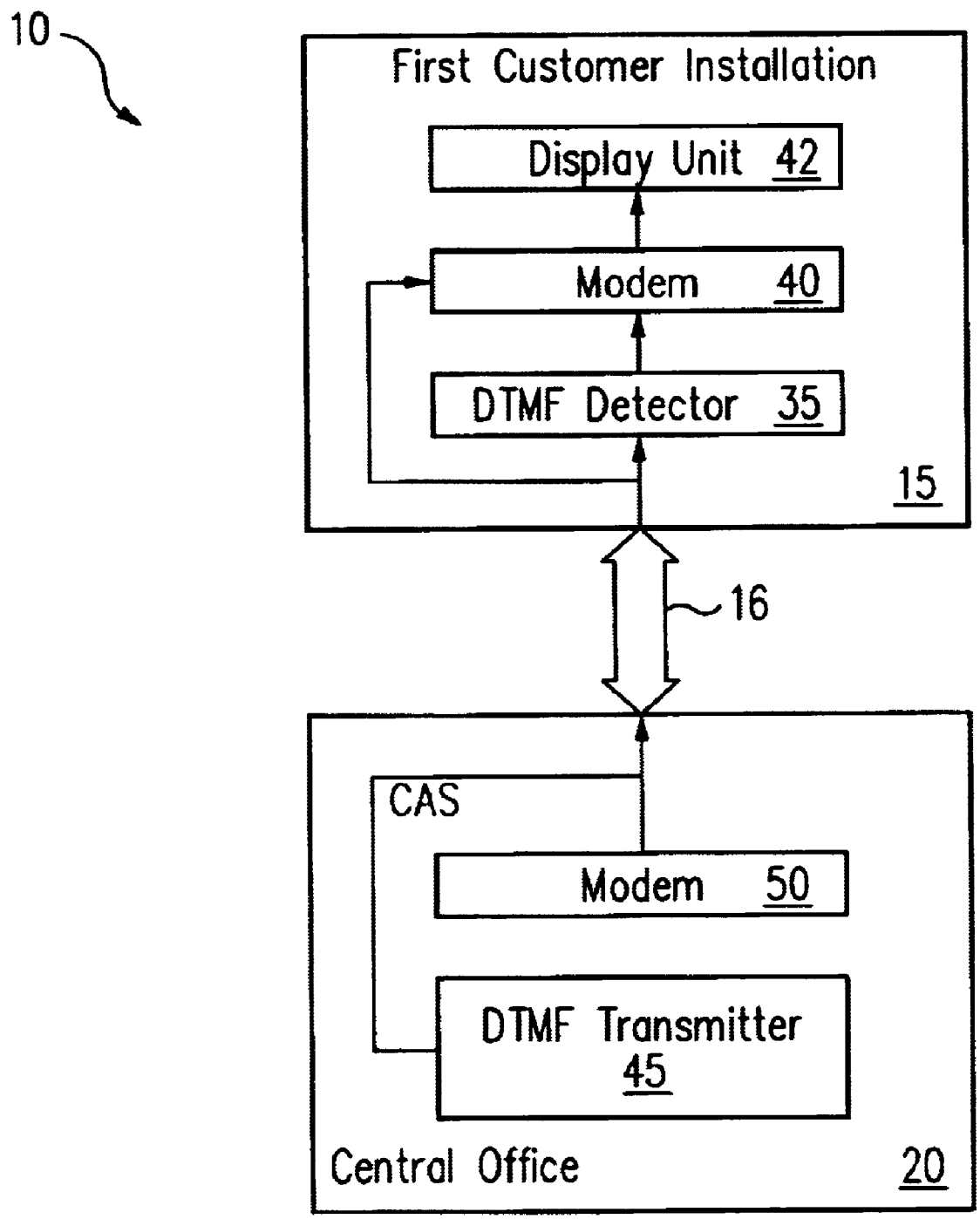
FIG. 1 depicts an environment wherein one embodiment of the present invention may be practiced.

With reference to the figures and in particular with reference now to FIG. 1, there is depicted an environment wherein one embodiment of the present invention may be practiced. Shown is a public switched telephone environment 10, consisting of central office 20 and first customer installation 15 connected by analog link 16. Depicted within central office 20 are Dual Tone Multi-Frequency (DTMF) Transmitter 45 and modem 50. Illustrated within first customer installation 15 are DTMF detector 35, modem 40, and display unit 42.

Illustrated is that DTMF transmitter 45 produces a dual tone Customer Premises Alerting Signal (CAS) and transmits that signal in voice band, along with any other information also being transmitted by modem 50, over analog link 16. Upon receipt of this analog signal, DTMF detector 35 detects and responds to any DTMF signal that might be present within the analog data received over analog link 16. Thereafter, the control information in any such received DTMF signal is either used to control various customer premises equipment, such as modem 40, or display certain information on display unit 42 (such as caller identification information) while the analog signal received over analog link 16 is passed on to modem 50.

Figure 2A:
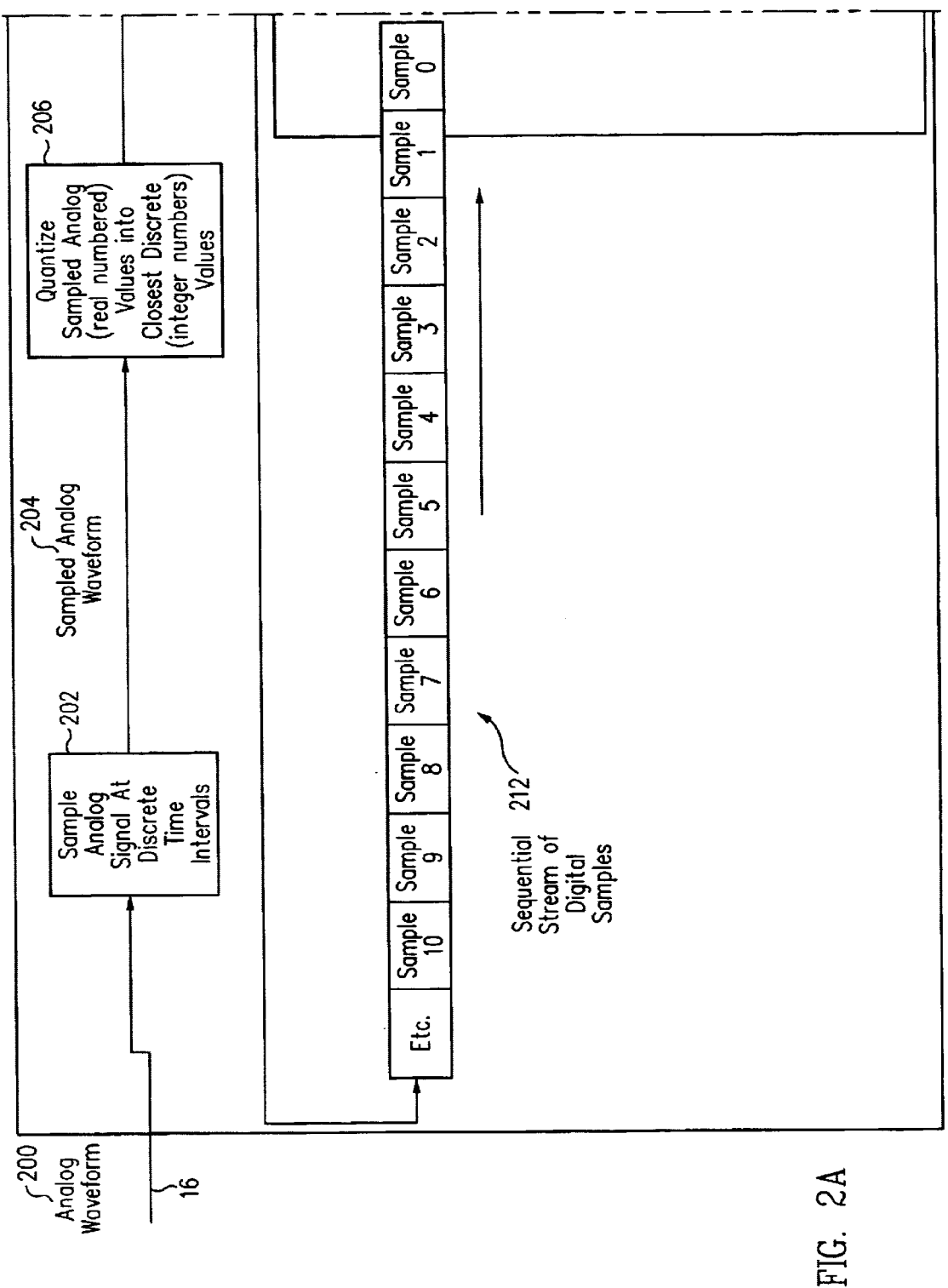
FIG. 2 (FIGS. 2A and 2B) is a high-level block diagram showing an embodiment of the present invention which can be practiced in the environment of FIG. 1.

Referring now to FIG. 2, which is a high-level block diagram showing an embodiment of the present invention which can be practiced in the environment of FIG. 1, shown is that Multi Tone Multi-Frequency detector 235 (which is similar to DTMF 35, but which can detect one or more tones as necessary rather than just two tones) receives analog waveform 200 via analog link 16 (although the term "tone" refers to tone signals within the human audal perception, it is to be understood that signals in other frequency bands can also be detected). Depicted is that analog waveform 200 is sampled at discrete time intervals by conventional sampling device 202. Illustrated is that the result of the sampling by conventional sampling device 202 is real-valued sampled analog waveform 204. Shown is that real-valued sampled analog waveform 204 then enters conventional quantization unit 206 wherein the real-valued samples of real valued sampled analog waveform 204 are converted into their nearest integer-valued equivalents, which results in quantized waveform 208.

Depicted is that quantized waveform 208 then enters conventional encoding unit 210, wherein each sequential integer value of quantized waveform 208 is converted into a digital sample string (typically consisting of 8–16 bits), which results in a stream of digital samples 212.

Depicted is that stream of digital samples 212 enters multi-frequency detector 251. Shown is that when "M" (the number of frequencies to be detected) multiple frequencies are to be detected, multi-frequency detector 251 contains a base analog frequency detector plus an additional M–1 frequency detectors 200l–200 M. Each analog frequency detector 200l–200M within multi tone detector 251 detects one or more analog frequencies within analog waveform 200, on the basis of stream of digital data samples 212, and outputs detection information to monotonic incremental energy increase per frame counters 201l–201M. Monotonic incremental energy increases per frame counters 201l–201M output the counts of the monotonic increases in incremental energies for each analog signals to multi-frequency signal present detection unit 252, which produces output signal 258, which is indicative of one or more multiple frequencies detected.

Figure 3:
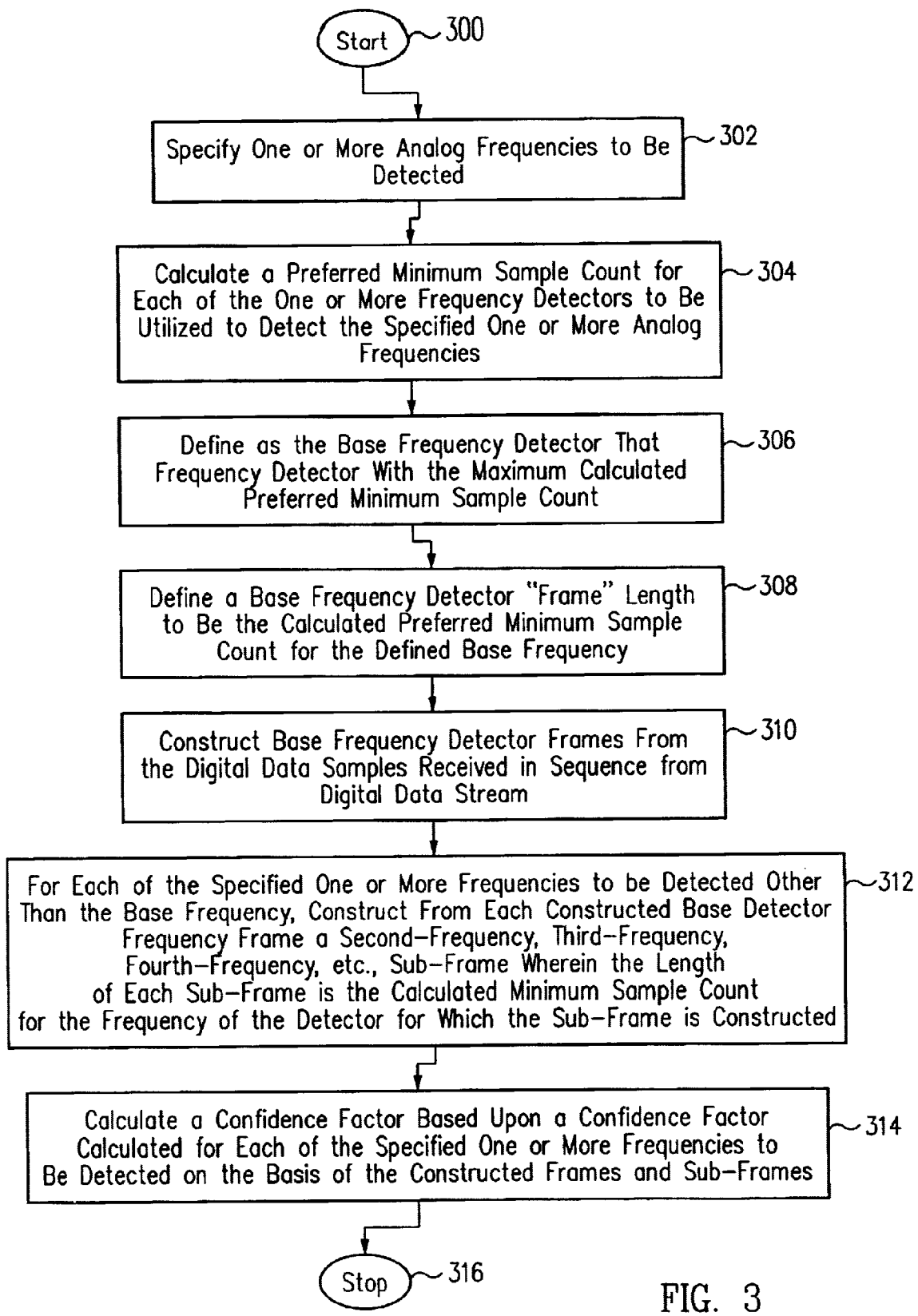
FIG. 3 a high-level logic flowchart depicting a process whereby one embodiment of the present invention detects multiple frequencies.

With reference now to FIG. 3, which is a high-level logic flowchart depicting a process whereby one embodiment calculates a confidence factor for multiple frequencies, method step 300 illustrates the start of the process. Method step 302 shows the specification of one or more (i.e., "M") analog frequencies to be detected. Method step 304 shows the calculation of a preferred minimum digital sample count for each of the frequency detectors 200l–200M (M being a positive integer) used to detect the specified one or more analog frequencies that are to be detected.

Method step 306 shows the definition of a base frequency detector, where the base frequency detector is defined to be the detector whose calculated preferred minimum digital sample count of method step 304 had the greatest length (e.g., if the calculated preferred minimum sample count for a frequency detector for X Hz were, for example, 10, and if the calculated preferred minimum sample count for a frequency detector for Y Hz were, for example, 20, frequency Y would be declared as the base frequency, and the detector for frequency Y Hz would be declared the base frequency detector). Method step 308 shows that a "frame" length (as used herein, the term "frame" refers to a defined number of a sequence of digital samples appearing within digital sample stream 212, and does not necessarily imply the use of framing data, such as frame start symbols and frame end symbols) for the base frequency detector is defined to be the calculated preferred minimum sample count for that base frequency detector (e.g., for frequency Y Hz, the base frequency, the base frequency detector "frame" length would be defined to be 20 samples.

Method step 310 illustrates the construction of base frequency detector frames from the digital data samples sequentially received via digital data stream 212. It is to be understood that since "frame" merely means a specified sequence of digital samples, the "construction" of frames, as used herein, could mean either that each received digital sample is processed individually up to the defined frame length (as in a specific embodiment described below), or that the entire frame is received and then processed.

Method step 312 shows the construction of sub-frames from each constructed base frequency detector frame. For each of the specified one or more frequencies to be detected other than the frequency defined to be the base frequency, there will be one sub-frame detector. The lengths of the sub-frames constructed will be the preferred minimum sample count for the frequency of the detector for which the sub-frame is created.

Method step 314 depicts that the analog frequency detectors 200l–200M in conjunction with the monotonic incremental energy increase per frame counters 201l–201M will then utilize the constructed frames and sub-frames to calculate a confidence factor based on confidence factors calculated for the likelihood of the presence of each of one or more multi-frequency signals to be detected. Method step 316 illustrates the end of the process.

Figure 4:
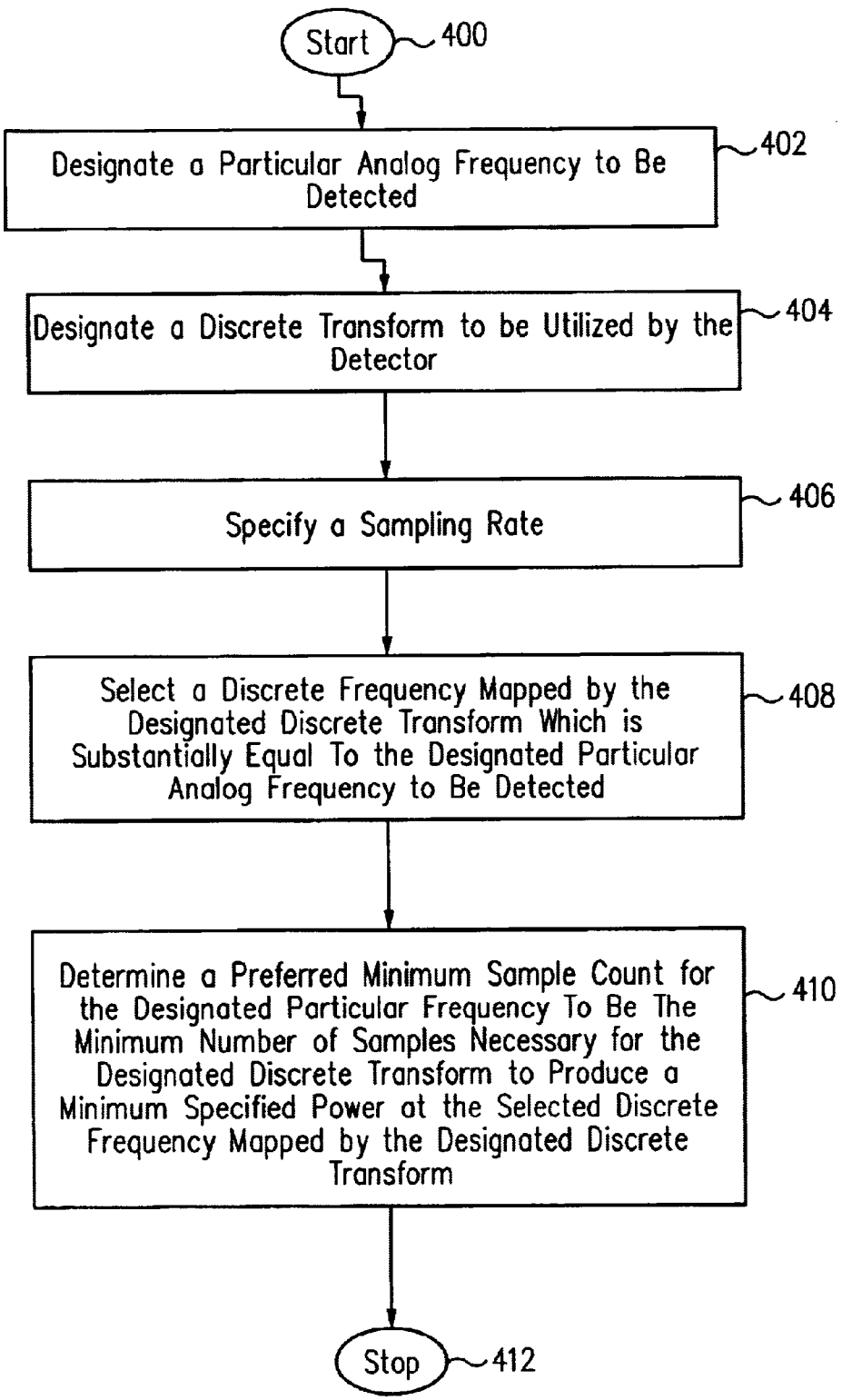
FIG. 4 is a high-level logic flowchart illustrating how one embodiment determines preferred minimum sample counts for a particular frequency detector.

Referring now to FIG. 4, which is a high-level logic flowchart illustrating how one embodiment determines preferred minimum sample counts for a particular frequency detector, method step 400 shows the start of the process. Method step 402 illustrates the designation of a particular analog frequency to be detected. Method step 404 depicts the designation of a discrete transform to be utilized by a detector in order to determine the preferred minimum sample counts. In the dual-frequency embodiment, described below, the designated discrete transform is the Discrete Fourier Transform as expressed by the Goertzel algorithm, but those skilled in the art will recognize that other discrete transforms can be substituted. Method step 406 illustrates that a sampling device 204 rate is specified.

Those skilled in the art will recognize that discrete transforms map signal energy to discrete frequencies, which may not always equate to the analog frequency to be detected. Those skilled in the art will also recognize that the accuracy of the discrete transform in mapping the energy at a particular discrete frequency goes up as the number of samples examined increases. Consequently, it is necessary both to choose a discrete frequency mapped by the designated discrete transform, which most closely approximates the desired analog frequency, and to choose a preferred minimum sample count which will give an energy of the chosen discrete frequency within defined bandwidth tolerances.

Method step 408 shows the selection of a discrete frequency mapped by the designated discrete transform which is substantially equal to the designated particular analog frequency to be detected. In the dual tone embodiment described below, the discrete frequency deemed substantially equal to the designated analog frequency is that which gives the smallest absolute error. Those skilled in the art will recognize that other selection criteria are possible.

Method step 410 depicts the empirical determination of the preferred minimum sample count to be that number of samples necessary to get the required power at the chosen frequency to exist within some minimum bandwidth specified by the system designer and dictated by the actual hardware, software, or firmware whereby the present invention is illustrated. Method step 412 depicts the end of the process.

For sake of clarity and ease of understanding, the operation of multi tone multi-frequency detector 251 will be explained via reference to an embodiment analogous to a dual tone multi-frequency detector (i.e., a multi tone multi-frequency detector where M, the number of frequencies to be detected, is 2), which has been set to detect two specific frequencies. However, it is to be understood that the dual tone multi-frequency example is intended to be merely illustrative, and not limiting, in that it is envisioned that the present invention will detect more than two frequencies via straightforward extensions of the method and system demonstrated in the context of the dual tone multi-frequency detector embodiment. That is, the present invention has a particularly useful dual tone-multi-frequency detector embodiment, but its embodiments include the ability to detect far more than just two tones or frequencies.

Figure 5A:
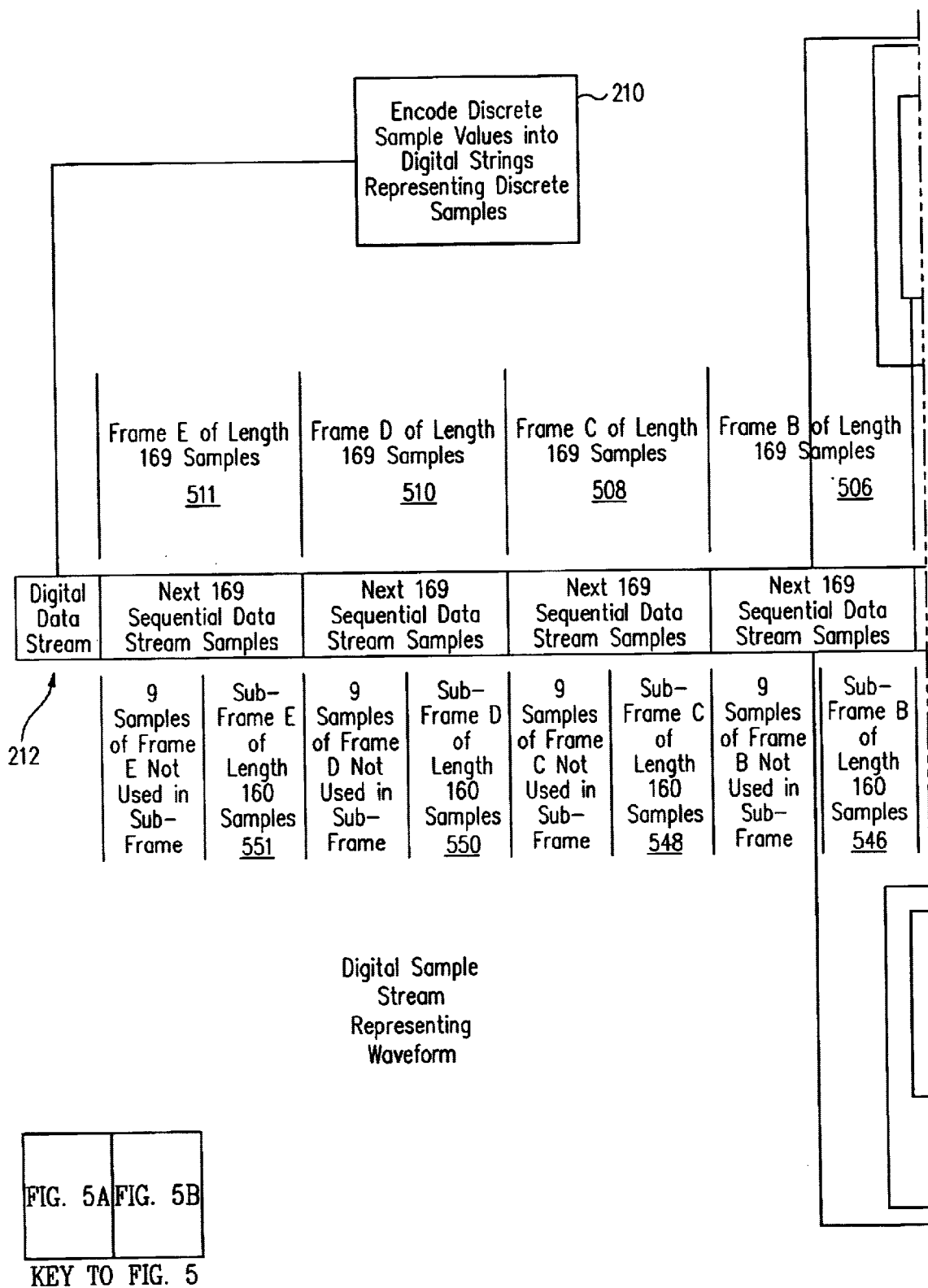
FIG. 5 (FIGS. 5A and 5B) is a high-level partially schematic diagram showing a dual tone multi-frequency embodiment of the present invention.
Figure 5B:
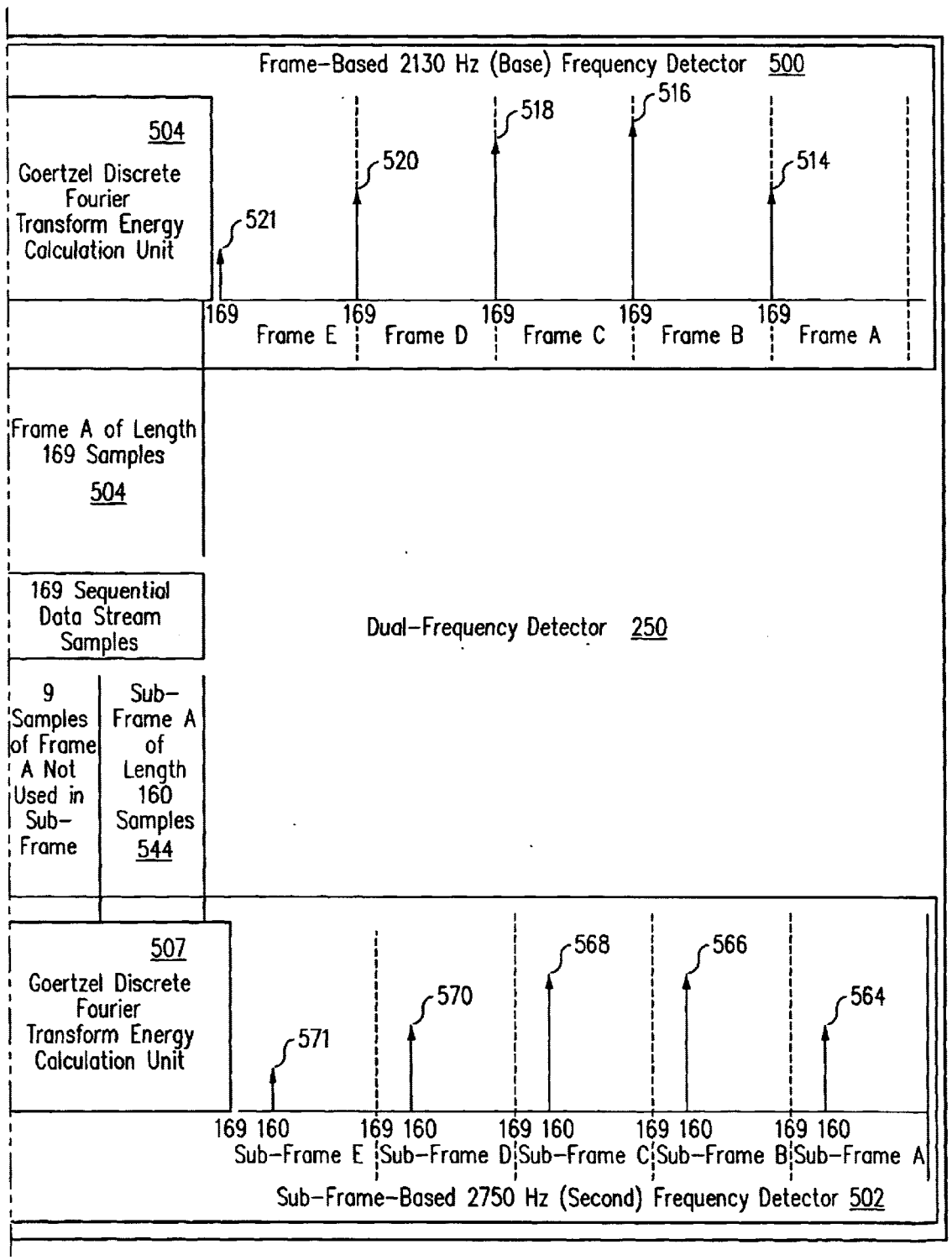

Referring now to FIG. 5, there is depicted a high-level partially schematic diagram showing a dual tone multi-frequency embodiment of the present invention described in the context of two specified frequencies: 2130 Hz (the base frequency, for reasons described below) and 2750 Hz (the second frequency, for reasons described below) frequencies. Shown in FIG. 5 is that the stream of digital samples 212 from encoding device 210 is accepted by dual frequency detector 250. Although for sake of clarity stream of digital data 212 is shown in FIG. 5 as being segmented into frames prior to entering dual-frequency detector 250, it is to be understood that in actuality digital sample stream 212 enters dual-frequency detector 250 as a stream, after which digital sample stream 212 is partitioned into frames and sub-frame size blocks. Shown is that contained within dual tone detector 250 are frame-based 2130 Hz detector 500 and sub-frame-based 2750 Hz detector 502, operating substantially in. parallel.

As will be shown below, the 2130 Hz signal has the greatest preferred minimum sample count, so it has been designated the base signal and has been used to define the base frequency detector frame length. Accordingly, shown is that frame-based 2130 detector 500 will accept digital data stream 212 as frames constructed from 169 samples (e.g., frame A 504, frame B 506, frame C 508, frame D 510, and frame E 511, all of length 169 data samples). As will also be shown below, the 2750 Hz signal has a preferred minimum sample count of 160, and thus shown is that sub-frame-based 2750 Hz detector 502 will accept sub-frames of length 160 samples, where such sub-frames are constructed from the frames of data constructed for frame-based 2130 Hz (base) frequency detector (e.g., sub-frame A 544 of length 160 data samples is shown as constructed from frame A 504, sub-frame B 546 of length 160 data samples is shown as constructed from frame B 506, sub-frame C 548 of length 160 data samples is shown as constructed from frame C 508, sub-frame D 550 of length 160 data samples is shown as constructed from frame D 510, and sub-frame 551 of length 160 date samples is shown as constructed from frame E 511).

Depicted is Goertzel Discrete Fourier Transform energy calculation unit 509 which is shown as accepting the 169 samples of data (or a frame of data), and outputting an energy signal contained within the frame subsequent to the receipt of that frame. Shown graphically are frame A energy 514, frame B energy 516, frame C energy 518, frame D energy 520, and frame E energy 521 associated with frame A 504, frame B 506, frame C 508, frame D 510, and frame E 511, respectively.

Depicted also is Goertzel Discrete Fourier Transform energy calculation unit 507 which is shown as accepting sub-frames of 160 samples of data constructed from the frames of data constructed for/by frame-based 2130 Hz detector 500, and outputting an energy signal contained within the sub-frame subsequent to the receipt of that sub-frame. Shown graphically are sub-frame A energy 564, sub-frame B energy 566, sub-frame C energy 568, frame D energy 570, and sub-frame E energy 571 associated with sub-frame A 544, sub-frame B 546, sub-frame C 548, sub-frame D 550, and sub-frame E 551, respectively. Shown is that Goertzel Discrete Fourier Transform energy calculation unit 507 outputs the sub-frame energies slightly before Goertzel Discrete Fourier Transform energy calculation unit 509. The reason for this is that the sub-frame energies are computed on 160 samples out of each 169 sample frame, and the last 9 samples in the frame are not computed, in contrast to the frame energies which are computed on the full 169 samples in each frame.

As has been discussed, the embodiment of FIG. 5 is representative of a specific dual-frequency embodiment which detects a CAS signal composed of two tones of specified frequency and duration. By way of example, the specified frequencies and duration of the CAS signal tones were defined as follows: Lower Tone: 2130 Hz+/−0.5%; Upper Tone: 2750 Hz+/−0.5%; Dynamic Range: −14 to −32 dBm per tone; Power Differential within Dynamic range: 0 to 6 dB between tones. The specified duration for the CAS at Customer Premises Equipment duration is 75 to 85 ms.

The foregoing noted signaling tolerances and duration were chosen in conformance to Bellcore Special Report SR-TSV-002476, Issue 1, December 1992, Appendix A, which is herein incorporated by reference in its entirety.

As has been indicated, the dual tone embodiment of FIG. 5 utilizes a variant of the Discrete Fourier Transform (DFT), the Goertzel algorithm, to calculate preferred minimum sample counts which are thereafter utilized to define frame and sub-frame lengths ultimately utilized to detect the dual-frequency signals. Accordingly, following is a general description of the Goertzel algorithm and how it is used to calculate preferred minimum sample counts in one embodiment of the present invention. For a more detailed description of this algorithm see "Introduction To Digital Signal Processing", J. G. Proakis, D. G. Manolaxis, MacMillan Publishing, which is hereby incorporated by reference.

Essentially, the Goertzel algorithm is a second-order recursive computation of the DFT using both a feedback and a feedforward phase. The feedback phase computes a new output y(n+1) for every new input sample x(n) where N is number of input samples. The feedback equation is:

$$y(n+1)=c*y(n)-y(n-1)+x(n) \qquad \text{Equation (1)}$$

where c is the Goertzel coefficient $$c=2*\cos(2*pi*f/F)$$

where f is the frequency to be detected and F is the sampling frequency

The feedforward phase is normally only calculated when n=N generating a single output energy parameter using, after some algebraic manipulation, the equation:

$$|Yk(N)|^2=y(n)*y(n)+y(n-1)*y(n-1)-2*c*y(n)*y(n-1) \qquad \text{Equation (2)}$$

where $$c=\cos(2*pi*k/N)=\cos(2*pi*f/F)$$

and avoids using complex arithmetic.

The Goertzel algorithm was used to calculate the preferred minimum sample counts for the two different defined frequencies in the dual-frequency embodiment of FIG. 5. In the following discussion, the preferred minimum sample counts are referred to as "N" As has been discussed above, in order to define the preferred minimum number of sample counts for each frequency, it is necessary to determine a discrete frequency closely corresponding to each specified analog frequency which is to be detected. In the following discussion, a discrete frequency is specified via reference to both N and the letter "k": N and k are formulaically related to the discrete frequency, dependent upon system sampling rate, in a manner set forth in equation (4) below. The context of the following discussion indicates with which frequency a particular letter N (preferred minimum sample length) or a particular letter k (a parameter correspondent to a specific discrete frequency substantially equal to the analog frequency to be detected) is to be associated.

Determining N and k for a given frequency requires a trade-off between accuracy and speed of detection of a desired discrete frequency. Accuracy and speed of detection are dependent upon N: if N is large, resolution in the frequency domain is good, but the time to generate the output from the feedforward phase of the Goertzel algorithm increases. This is because N samples must be processed in the feedback phase before the output from the feedforward phase can be calculated. That is, in the Goertzel algorithm all N samples must be calculated before a final energy can be calculated.

The spacing of the energy output values in the frequency domain from feedforward phase is equal to half the sampling frequency divided by N. Therefore, if some tone is present in the input signal which does not fall exactly on one of these frequency points, the energy of this frequency component appears mostly in the closest frequency point but partly in the other frequency points—a phenomenon known as leakage. Thus, in order to avoid leakage, it is desirable for the tones requiring detection to be centered exactly on a frequency point. These discrete frequency points are referred to by the k value in the equation (2) above. This value is an integer value lying in the range 0,1, . . . , N–1 where the actual frequency to which k corresponds depends on the sampling frequency F and N using the following formula:

$$\frac{f(tone)}{F(sampling)} = \frac{k}{N} \qquad \text{Equation (3)}$$

$$\text{Therefore } k = \frac{N}{F(sampling)} * f(tone) \qquad \text{Equation (4)}$$

where f(tone) is the frequency to be detected and k is an integer.

The sampling frequency F used in a telephone network is typically 8 kHz, which will be used here as the specified sampling rate, leaving only the variable N that can be modified. Since the k values must be integers, the corresponding frequency points may not be exactly aligned with the tones required to be detected. The k values will therefore have a corresponding absolute error e (k) associated with them defined as the difference between the real number k and the closest integer to this real value. This is shown below:

$$\text{absolute error } e(k) = \left| \frac{N*f(tone)}{F(sampling)} - \text{closest integer } \frac{N*f(tone)}{F(sampling)} \right| \qquad \text{Equation (5)}$$

Using Equation (5) above, the values of N best suited to the CAS tones of 2130 and 2750 Hz were determined as follows:

Since the defined CAS tone duration is 75–85 ms which is equivalent to 600–680 samples at the 8 kHz sampling frequency, a frame detection length of approximately 150–170 samples would allow the detection algorithm to perform detection on 4 consecutive frames of the tones present in the input signal (the number of consecutive frames to utilize is a choice within the purview of the system designer, so long as N is of sufficient magnitude to allow the detector to detect signals with the prescribed bandwidth—e.g., +/−0.5% of frequency to be detected.). Using this range of 150–170 samples, an analysis resulted in the values shown below in Table 1 being chosen for the two CAS tones:

TABLE 1

| f(tone) | N value | k value (float) | k value (integer) | absolute error e(k) | coefficient |
|---------|---------|-----------------|-------------------|---------------------|-------------|
| 2130.0  | 169     | 44.99625        | 45                | 0.00375             | −0.204126297 |
| 2750.0  | 160     | 55.0            | 55                | 0.00                | −1.111140466 |

Since the 2750 Hz tone uses less samples to calculate the final frame energy, a normalization of this final energy value is required so that energy comparisons for the 2130 and the 2750 Hz tone are meaningful. This is achieved by multiplying the final 2750 frame energy by the factor:

$$(169/160)^2=1.115664063$$

As shown, the preferred minimum sample count for the specified 2130 Hz frequency is 169 samples, and the preferred minimum sample count for the 2750 Hz frequency is 160 samples. Consequently, since the 2130 Hz has the greatest preferred minimum sample count, the base detector frequency was shown in FIG. 5 as 2130 Hz, and the base detector frame length was shown as 169 samples. Likewise, the second frequency was shown in FIG. 5 as 2750 Hz, and the second frequency sub-frame length was shown as 160 samples.

Exactly how the dual-frequency embodiment (and by straightforward extension, how the multi tone multi-frequency embodiment) utilizes the frames and sub-frame lengths will be described shortly.

Figure 6A:
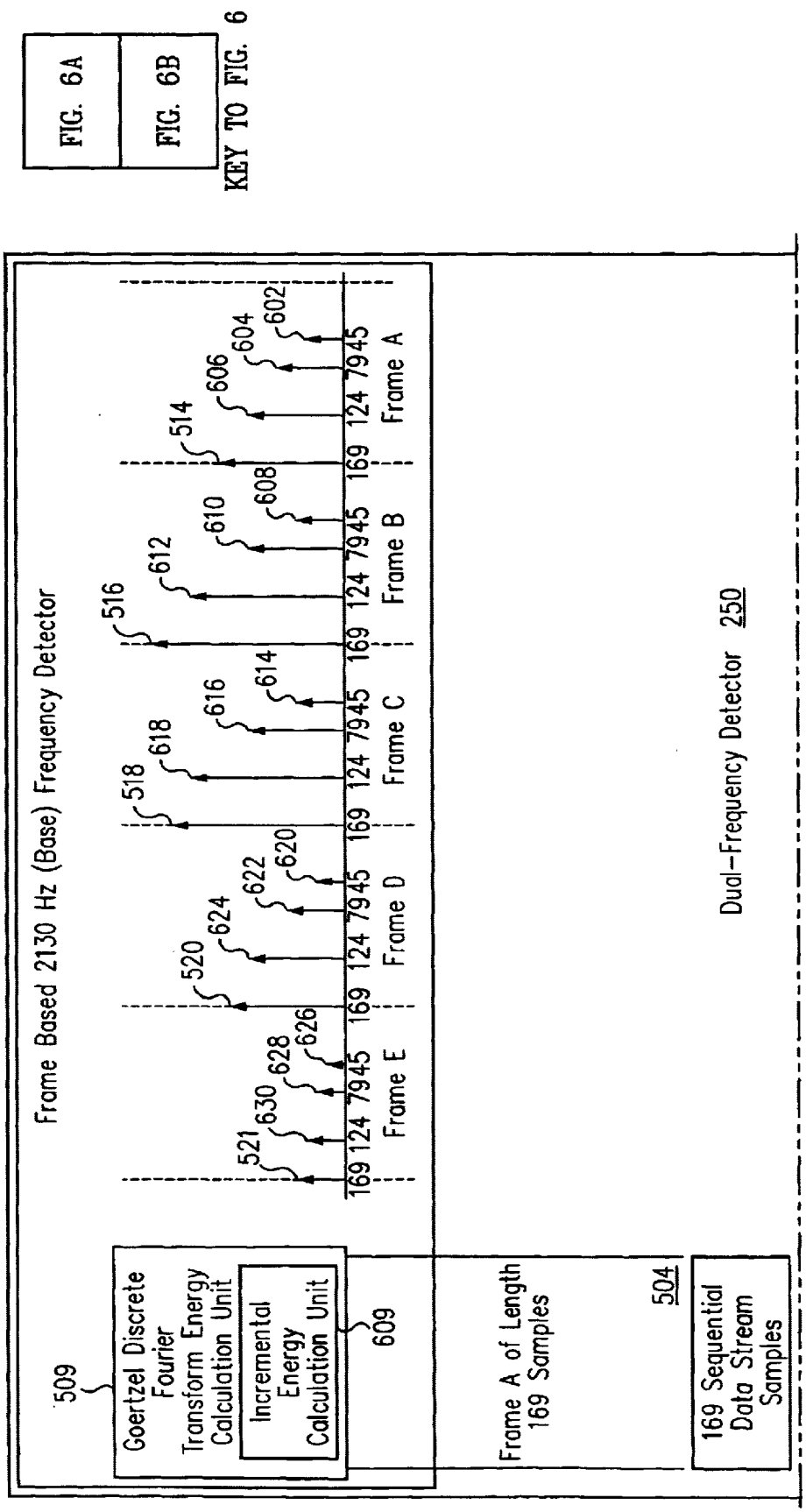
FIG. 6 (FIGS. 6A and 6B) is a high-level partially schematic diagram showing the high-level partially-schematic diagram of FIG. 5, modified such that incremental energy calculations are now included within Goertzel Discrete Fourier Transform units.
Figure 6B:
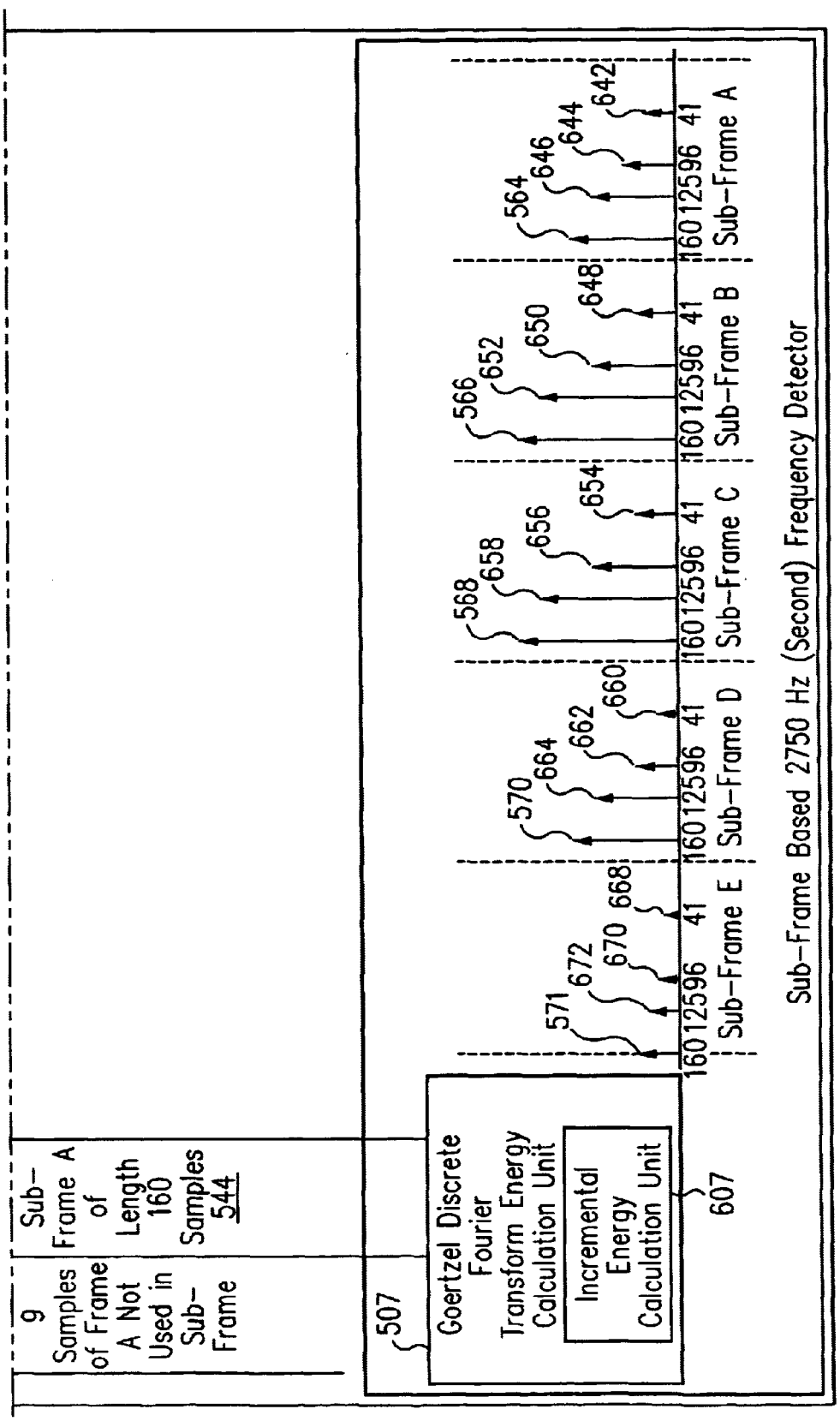

Referring now to FIG. 6, there is depicted a high-level partially schematic diagram showing the high-level partially schematic diagram of FIG. 5, modified such that Goertzel discrete Fourier transform units 507 and 509 now contain incremental energy calculation units 607 and 609, respectively.

Depicted is Goertzel Discrete Fourier Transform energy calculation unit 509 which is shown as accepting the 169 samples of data (or a frame of data), and outputting an energy signal contained within the frame subsequent to the receipt of that frame. Depicted graphically is that incremental energy calculation unit 609 calculates incremental frame energies at 45 samples, 79 samples, 124 samples, and 169 samples (i.e. the last incremental frame energy is the same as the calculated frame energy). Accordingly, shown, at the referenced sample intervals, are incremental frame A energies 602, 604, 606, and 514, incremental frame B energies 608, 610, 612, and 516, incremental frame C energies 614, 616, 618, and 518, incremental frame D energies 620, 622, 624, and 520, and incremental frame E energies 626, 628, 630, and 521, with each grouping of incremental energies associated with frame A 504, frame B 506, frame C 508, frame D 510, and frame D 511, respectively.

Depicted also is Goertzel Discrete Fourier Transform energy calculation unit 507 which is shown as accepting sub-frames of 160 samples of data constructed from the frames of data constructed foriby frame-based 2130 Hz detector 500, and outputting an energy signal contained within the frame subsequent to the receipt of that frame. Depicted graphically is that incremental energy calculation unit 607 calculates incremental frame energies at 41 samples, 96 samples, 125 samples, and 160 samples (i.e. the last incremental frame energy is the same as the sub-frame energy). Accordingly, shown, at the referenced sample intervals, are incremental sub-frame A energies 642, 644, 646, and 564, incremental sub-frame B energies 648, 650, 652, and 566, incremental sub-frame C energies 654, 656, 658, and 568, incremental sub-frame D energies 660, 662, 664, and 570, and incremental sub-frame E energies 668, 670, 672, and 571, with each grouping of incremental energies associated with sub-frame A 544, sub-frame B 546, sub-frame C 548, sub-frame D 550, and sub-frame D 511, respectively. Shown is that Goertzel Discrete Fourier Transform energy calculation unit 507 outputs the sub-frame energies slightly before Goertzel Discrete Fourier Transform incremental energy calculation unit 509. The reason for this is that the sub-frame energies are computed on 160 samples out of each 169 sample frame, and the last 9 samples in the frame are not computed, in contrast to the frame energies which are computed on the full 169 samples in each frame.

The interval energies calculated by incremental energy calculation units 607, and 609 are calculated utilizing the Goertzel algorithm in substantially the same way as the frame energies are calculated, except that the incremental energies are calculated at the interval sample counts shown (e.g., incremental energy calculation unit 607 calculates incremental energies at 41, 96, 125 and 160 interval sample counts, and incremental energy calculation unit 607 calculates incremental energies at 45, 79, 124 and 169 interval sample counts). The intervals utilized by in FIG. 6 are calculated in substantially the same way as the preferred minimum sample lengths for the frequencies to be detected. That is, once the number of intervals per frame/sub-frame to be utilized to calculate the interval energies has been established (4, in the present example, but such number of intervals is a free choice up to the system designer), values of N (sample count) and k are selected such that the number of sample counts will yield the frequency to be detected. While such value of N will not meet the minimum signal bandwidth requirements (since it will be smaller than the calculated preferred minimum sample count), such will be sufficient to give a confidence estimate as to the presence or absence of a DTMF signal, in the fashion discussed below.

Figure 7A:
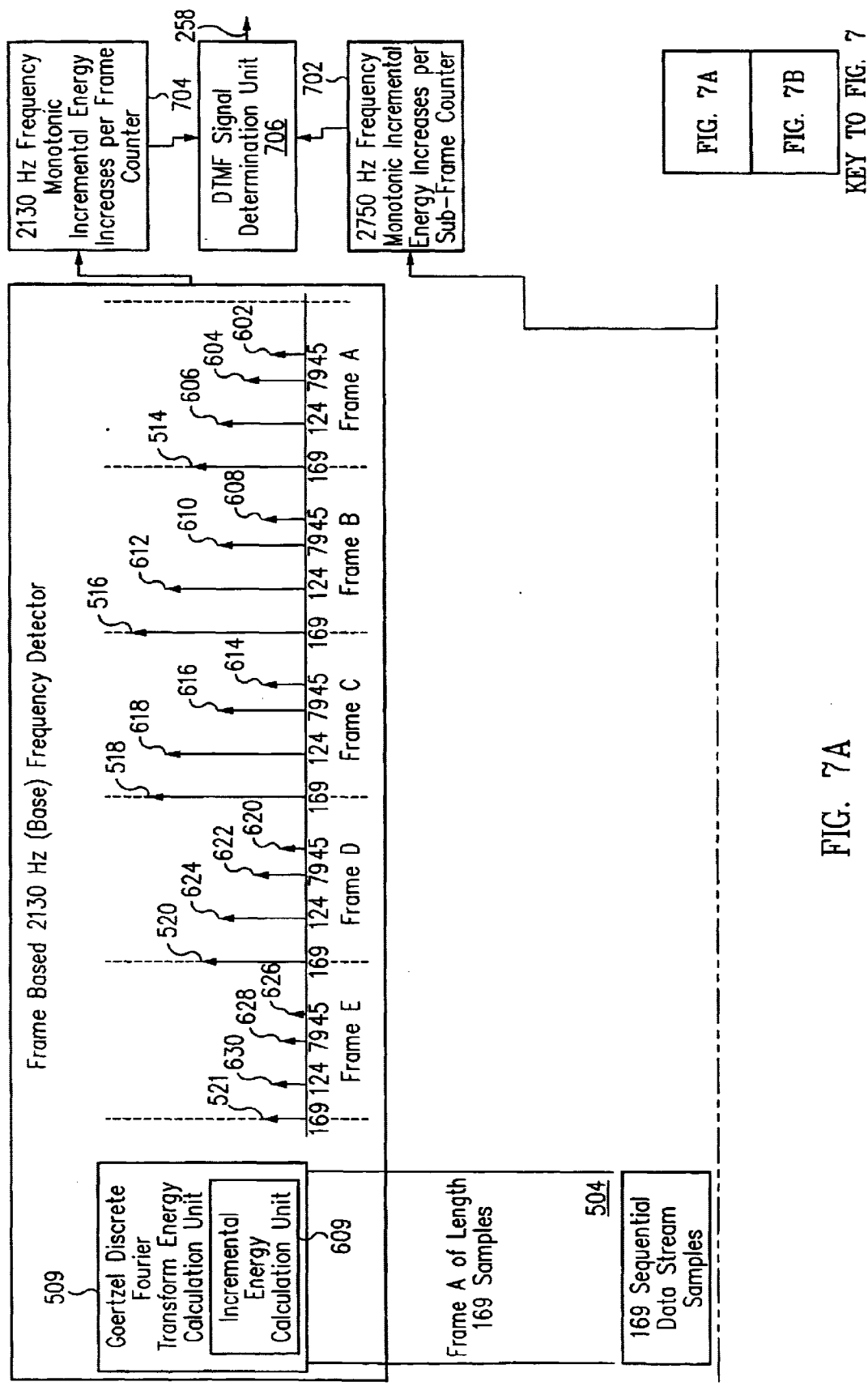
FIG. 7 (FIGS. 7A and 7B) is a high-level partially schematic diagram illustrating how one embodiment of the present invention calculates and utilizes incremental energies to give an estimate of the likelihood that a DTMF signal is present.
Figure 7B:
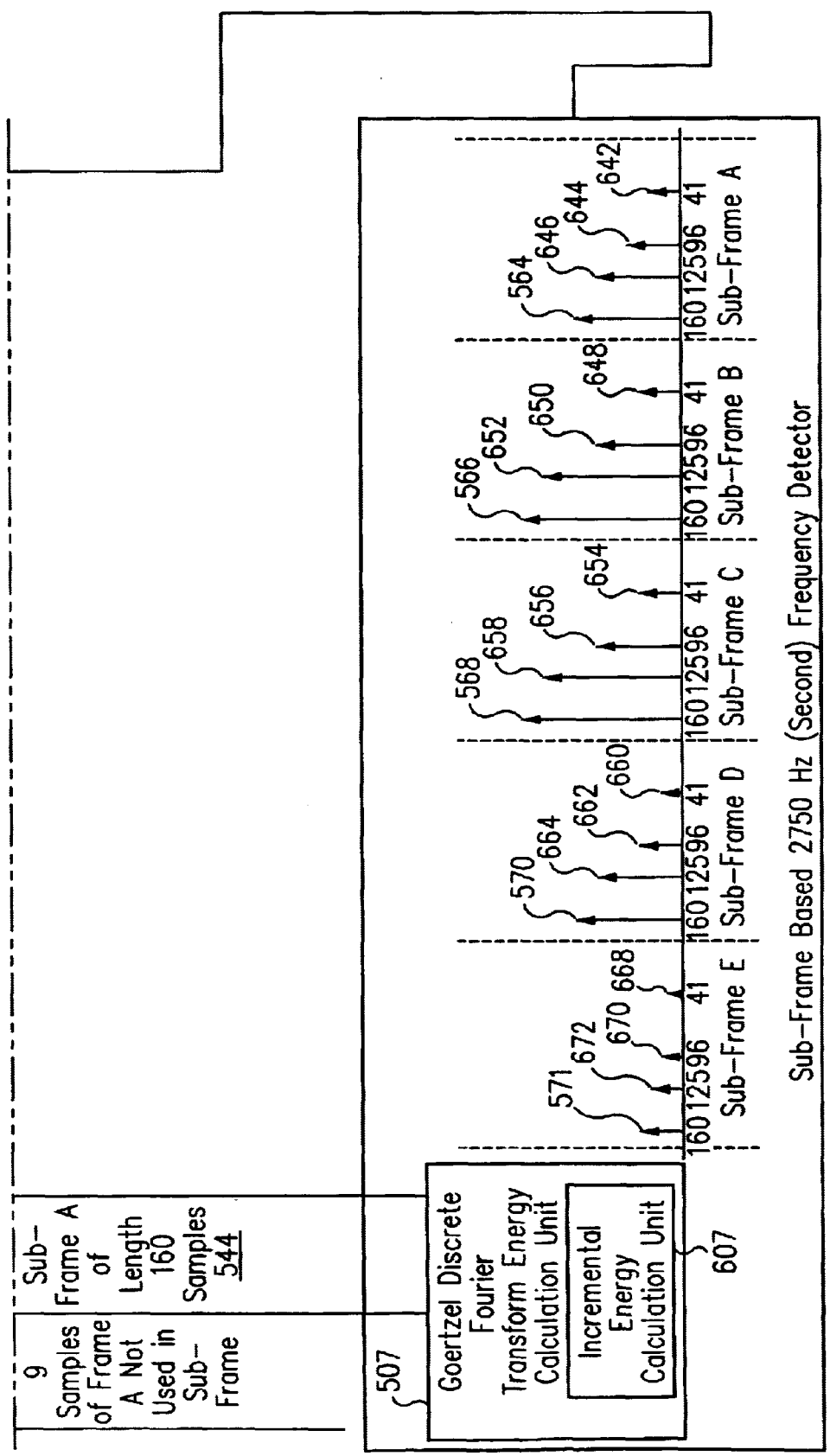

With reference now to FIG. 7, which is a high-level partially schematic diagram illustrating how one embodiment of the present invention utilizes incremental energy increases to give an estimate of the likelihood that a DTMF signal is present, shown is that the output of Goertzel Discrete Fourier Transform energy calculation unit 507 (the incremental sub-frame energies) is delivered to 2750 Hz frequency monotonic incremental energy increases per sub-frame counter 702. 2750 Hz frequency monotonic incremental energy increases per sub-frame counter 702 utilizes the incremental energies to calculate the number of times that subsequent incremental frame energies represent a monotonic increase. Further illustrated is that the output of Goertzel Discrete Fourier Transform energy calculation unit 509 (the incremental frame energies) is delivered to 2130 Hz frequency monotonic incremental energy increases per sub-frame counter 704. 2130 Hz frequency monotonic incremental energy increases per sub-frame counter 704 utilizes the incremental energies to calculate the number of times that subsequent incremental sub-frame energies represent a monotonic increase. Thereafter, both 2750 Hz frequency monotonic incremental energy increases per sub-frame counter 702 and 2130 Hz frequency monotonic incremental energy increases per sub-frame counter 704 output their counted monotonic increases in incremental sub-frame and frame energies, respectively, to DTMF signal determination unit 706 (a dual-frequency embodiment of multi-frequency signal present detection unit 252) which utilizes the counts to give an estimate as to the likelihood that a DTMF signal is present.

It was explained above that, given a chosen system sampling rate, a "free choice" is available to the system designer regarding the number of "frames" which will be utilized to detect a frequency of defined duration (in the above-referenced example, the number of frames was chosen as 4 dependent upon the system sampling rate). That is, given the system sampling rate and the range of time duration during which the signal is to be detected, the system designer can define the range of the number of samples necessary to detect a designated frequency for a designated time, which a system designer can then break into a number of designated frames with a given range of sample lengths (e.g., a tone duration of 75–85 ms equivalent to 600–800 samples at 8 kHz sampling frequency, was broken into 4 frames given a range of 150–170 sample length), such range then being utilized to determine the sample length for the frames and sub-frames, as described above.

Figure 8:
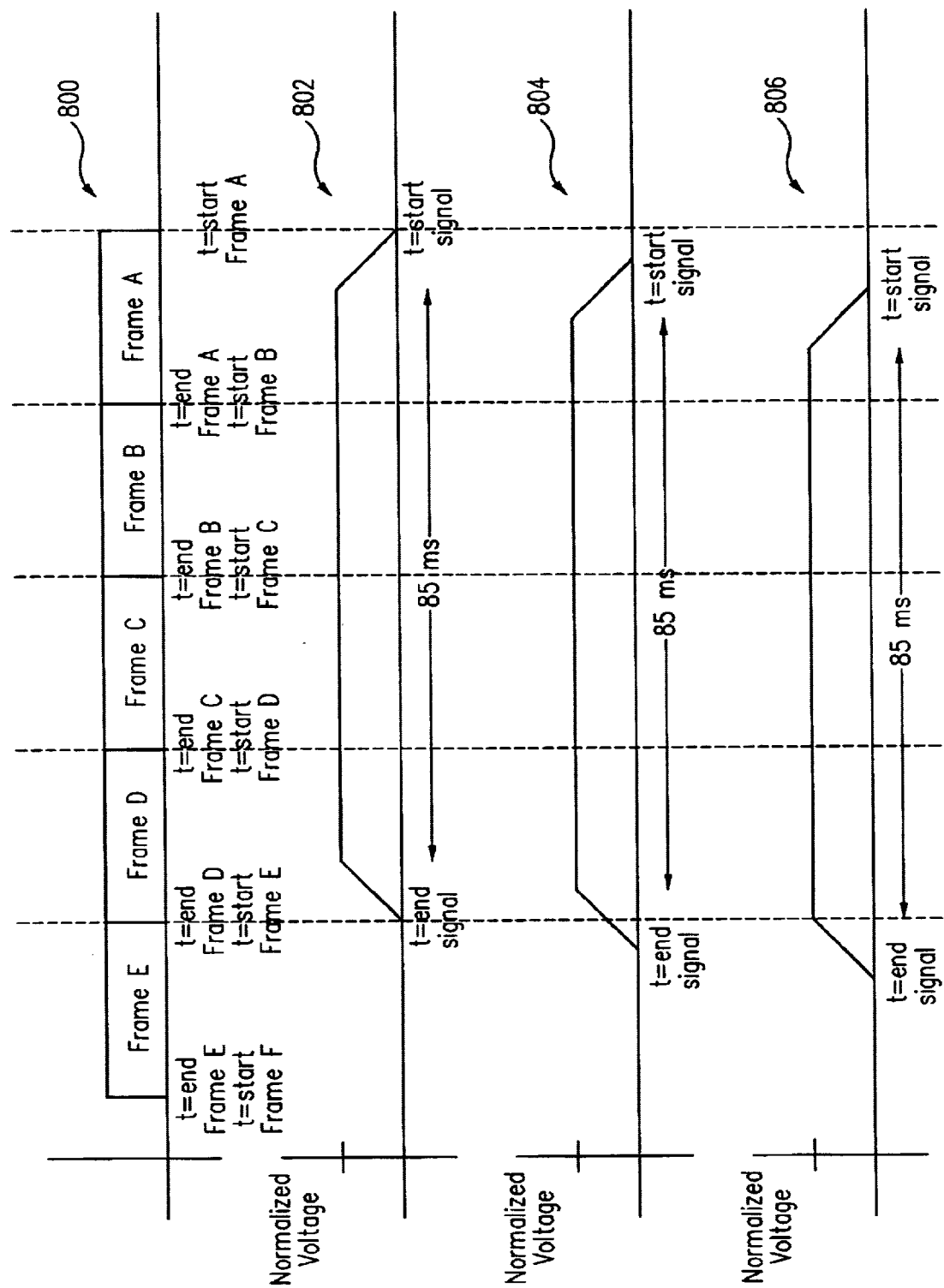
FIG. 8 is a pictographic representation illustrating how a specific frequency signal coordinates with the frame lengths.

Referring now to FIG. 8, which is a pictographic representation illustrating how a specific frequency signal coordinates with the frame lengths previously discussed for the 2130 Hz (base) frequency signal, shown is an illustrative diagram 800 wherein are depicted 5 frames (frame A, frame B, frame C, frame D, and frame E) of digital sample stream 212 data. Further shown are three illustrative diagrams 802, 804, 806 depicting the presence (denoted by a value of 1) or absence (denoted by a value of 0) of a normalized voltage of an analog signal at 2130 Hz signal for a duration 85 ms. In the event that the time interval of the 2130 Hz signal for a duration 85 ms exactly matches the start and stop boundaries of four consecutive frames, as shown in diagram 802, this maximum duration signal can be detected by the use of 4 frames. However, in the event that the time interval of the 2130 Hz signal for a duration 85 ms does not exactly match the start and stop boundaries of four consecutive frames, as shown in diagrams 804 and 806, this maximum duration signal will be spread over 5 frames, and thus 5 frames are necessary to detect the duration of the signal. An analogous situation exists with respect to the detection of signals utilizing sub-frames.

The fact that the signal energy can be spread over 4 or 5 frames (or sub-frames) is utilized by the foregoing discussed DTMF signal determination unit 706 to give a confidence estimate as to whether a DTMF signal is present. However, while the embodiments are being discussed in relation to specific frequencies of defined specific duration being utilized in a specific number of frames, those skilled in the art will recognize that such embodiments are illustrative and not limiting, in that the basic method illustrated by specific example can be adapted to other defined frequencies of other defined duration to be detected utilizing other system designer chosen numbers of base frames.

FIG. 8 has demonstrated that detection of a signal in the 2130/2750 Hz embodiment takes approximately 4 complete frames of data. A comparison of this fact with the either the frame or sub-frame interval energies of FIGS. 6 and 7 shows that if a DTMF frequency is present, it can be expected that somewhere around 12 monotonic increases can be found over 4 frames. This is true both for the frames and the sub-frames of FIGS. 6 and 7. That is, each complete frame has 3 monotonic increases, in the absence of noise.

It has been discovered that the same relationship holds, in a general sense, in the presence of noise. It has been found empirically that such a relationship can be utilized to give a confidence factor estimate as to the likelihood that a DTMF signal is present.

Figure 9A:
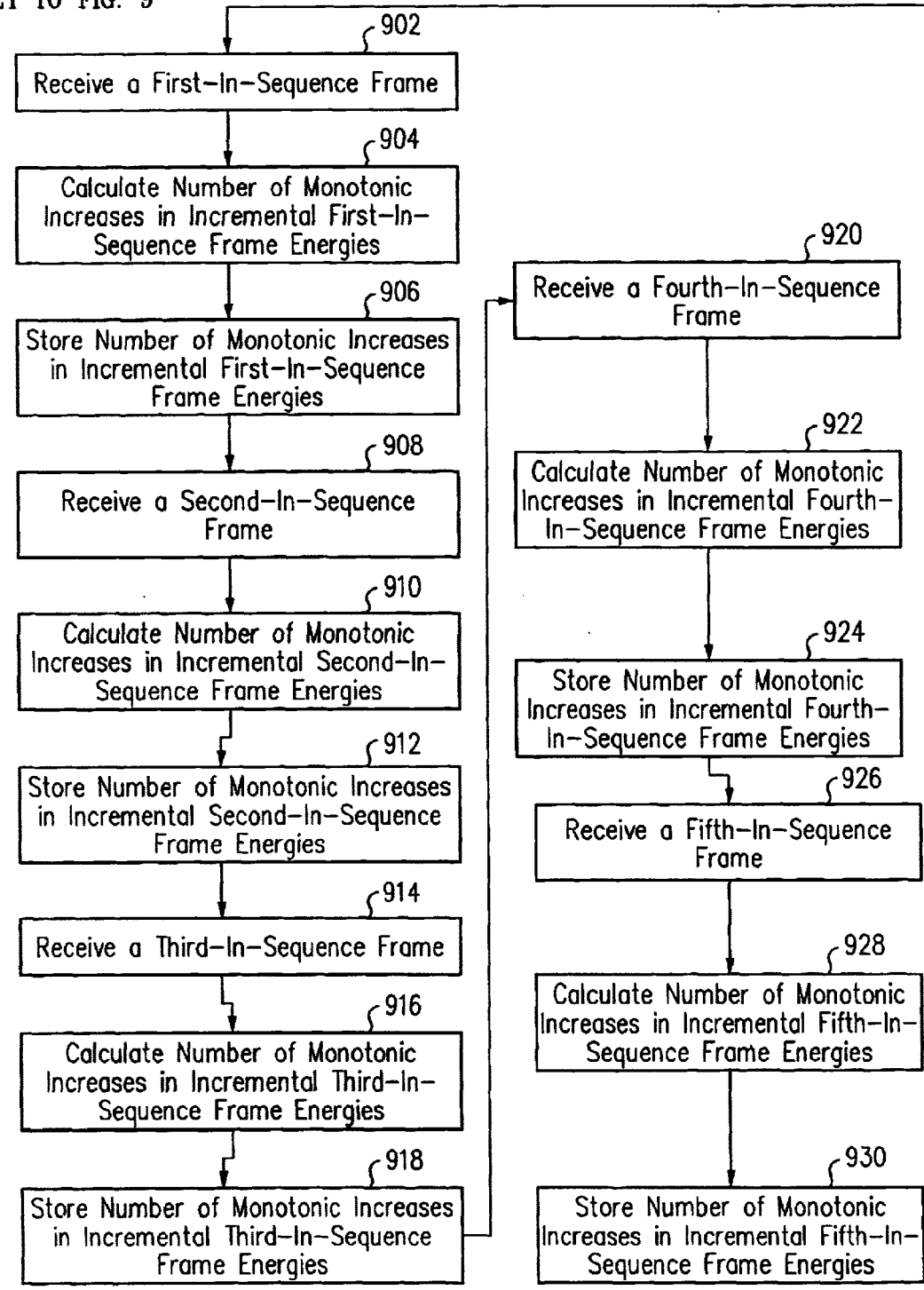
FIG. 9 (FIGS. 9A and 9B) constitutes a high-level logic flowchart which illustrates how an embodiment of a 2130 Hz (base) frequency monotonic incremental energy increases per frame counter unit calculates monotonic increases over several frames.
Figure 9B:
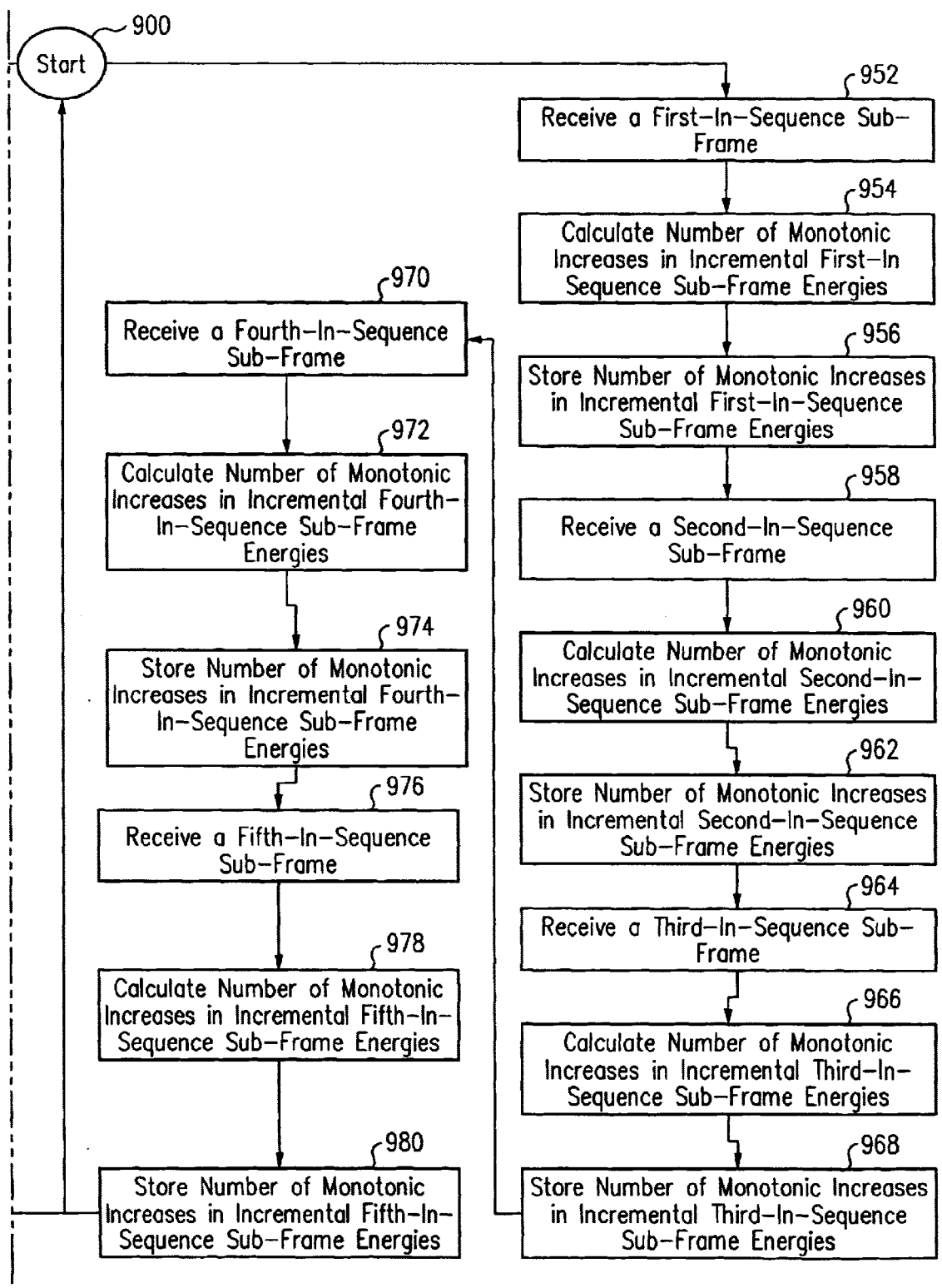

Referring now to FIG. 9, which constitutes a high-level logic flowchart which illustrates how a 2130 Hz frequency monotonic incremental energy increases per frame counter 704 calculates monotonic increases over several frames which DTMF signal determination unit 706 then utilizes to give a confidence estimate for the presence or absence of a DTMF signal. FIG. 9 actually depicts two processes: a first frame-based process for to be engaged in by 2130 Hz frequency monotonic incremental energy increases per frame counter 704 and a second sub-frame based process to be engaged in by 2750 Hz frequency monotonic incremental energy increases per sub-frame counter 702. The processes are shown together since they are to be engaged in substantially simultaneously by the substantially parallel counting devices.

Method step 900 depicts the start of the process. The frame based process consists of method steps 902–930. This series of method steps can conceptually be broken down into 5 groups of three repetitive steps: receiving a frame, calculating the number of monotonic increases in the received frame's incremental frame energies, and storing the number of monotonic increases for the received frame. For example, method steps 902–906 show these three steps for a first-in-sequence received frame, method steps 908–912 show these three steps for a second-in-sequence received frame, method steps 914–918 show these three steps for a third-in-sequence received frame, method steps 920–924 show these three steps for a fourth-in-sequence received frame, and method steps 926–930 show these three steps for a fifth-in-sequence received frame. Thereafter, the process proceeds to method step 900 and restarts with the next received frame. The process is shown for 5 frames since, as shown in relation to FIG. 8, the most frames that will ever be required to detect signal in the 2130/2750 Hz dual-frequency detector embodiment is five. Thus, the last 5 frames in sequence will typically be the ones necessary to effect signal detection and thus the process of FIG. 9 keeps a record of the monotonic increase of the last 5 frames received.

The sub-frame based process consists of method steps 952–970. This series of method steps can conceptually be broken down into 5 groups of three repetitive steps: receiving a sub-frame, calculating the number of monotonic increases in the received sub-frames incremental sub-frame energies, and storing the calculated number of monotonic increases for the received sub-frame stored. For example, method steps 952–956 show these three steps for a first-in-sequence received. sub-frame, method steps 958–962 show these three steps for a second-in-sequence received sub-frame, method steps 964–968 show these three steps for a third-in-sequence received sub-frame, method steps 970–974 show these three steps for a fourth-in-sequence received sub-frame, and method steps 976–980 show these three steps for a fifth-in-sequence received sub-frame. Thereafter, the process proceeds to method step 900 and restarts with the next received sub-frame. The process is shown for 5 sub-frames since, as shown in relation to FIG. 8, the most sub-frames that will ever be required to detect signal in the 2130/2750 Hz dual-frequency detector embodiment is five. Thus, the last 5 sub-frames in sequence will typically be the ones necessary to effect signal detection and thus the process of FIG. 9 keeps a record of the monotonic increase of the last 5 sub-frames received.

Figure 10:
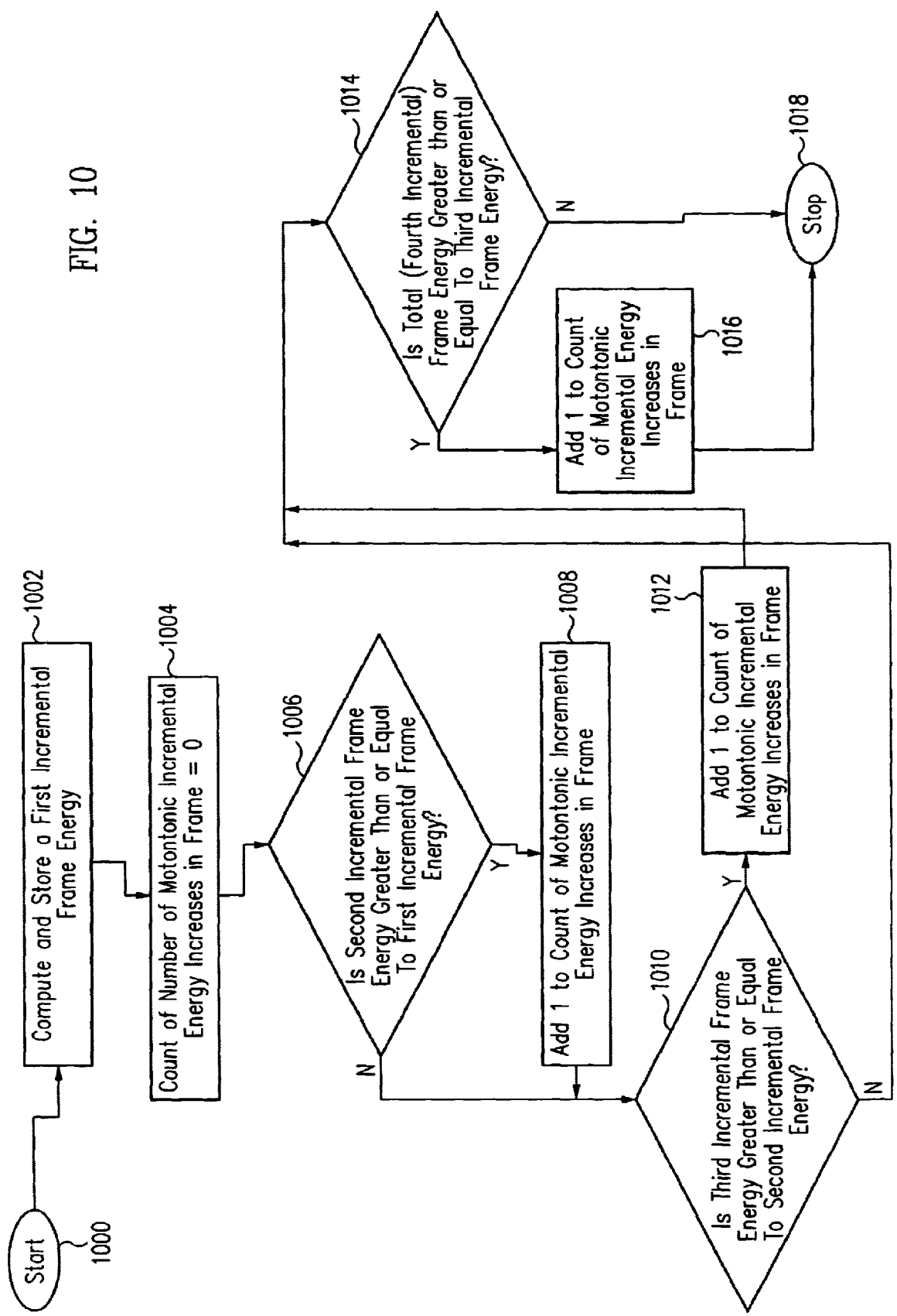
FIG. 10 is a high-level logic flowchart depicting how one embodiment of the present invention determines monotonic incremental energy increases within one frame.

With reference now to FIG. 10, shown is high-level logic flowchart of the process whereby one embodiment of the present invention determines the number of incremental frame energy increases. For sake of clarity, FIG. 10 will be discussed in the context of frame A 504, but it is to be understood that such contextual discussion is intended to be illustrative for any frame, and not limiting. Method step 1000 depicts the start of the process. Method step 1002 illustrates that the computation and storage of first incremental energy 602. Thereafter method step 1004 shows that a count of the number of monotonic incremental energy increases for the current frame (frame A 504) is set to 0. Thereafter, method step 1006 depicts the inquiry as to whether second incremental fame energy 604 is greater than first incremental frame A energy 602. In the event that second incremental fame A energy 604 is not greater than first incremental frame A energy 602, the process proceeds directly to method step 1010. However, if the second incremental frame A energy 604 is greater than first incremental frame A energy 602, the process proceeds to method step 1008, wherein it is illustrated that the count of monotonic incremental energy increases for frame A 504 is incremented by 1, after which the process proceeds to method step 1010.

Method step 1010 shows the inquiry as to whether third incremental frame A energy 606 is greater than second incremental frame A energy 604. In the event that third incremental frame A energy 606 is not greater than second incremental frame A energy 604, the process proceeds directly to method step 1014. However, if the third incremental frame A energy 606 is greater than second incremental frame A energy 604, the process proceeds to method step 1012, wherein it is illustrated that the count of monotonic incremental energy increases for frame A 504 is incremented by 1, after which the process proceeds to method step 1014.

Method step 1014 shows the inquiry as to whether fourth incremental frame A energy 514 is greater than third incremental frame A energy 606. In the event that fourth incremental frame A energy 514 is not greater than third incremental frame A energy 606, the process proceeds directly to method step 1018. However, if the fourth incremental frame A energy 514 is greater than third incremental frame A energy 606, the process proceeds to method step 1016, wherein it is illustrated that the count of monotonic incremental energy increases for frame A 504 is incremented by 1, after which the process proceeds to method step 1018 which shows the end of the process.

Figure 11:
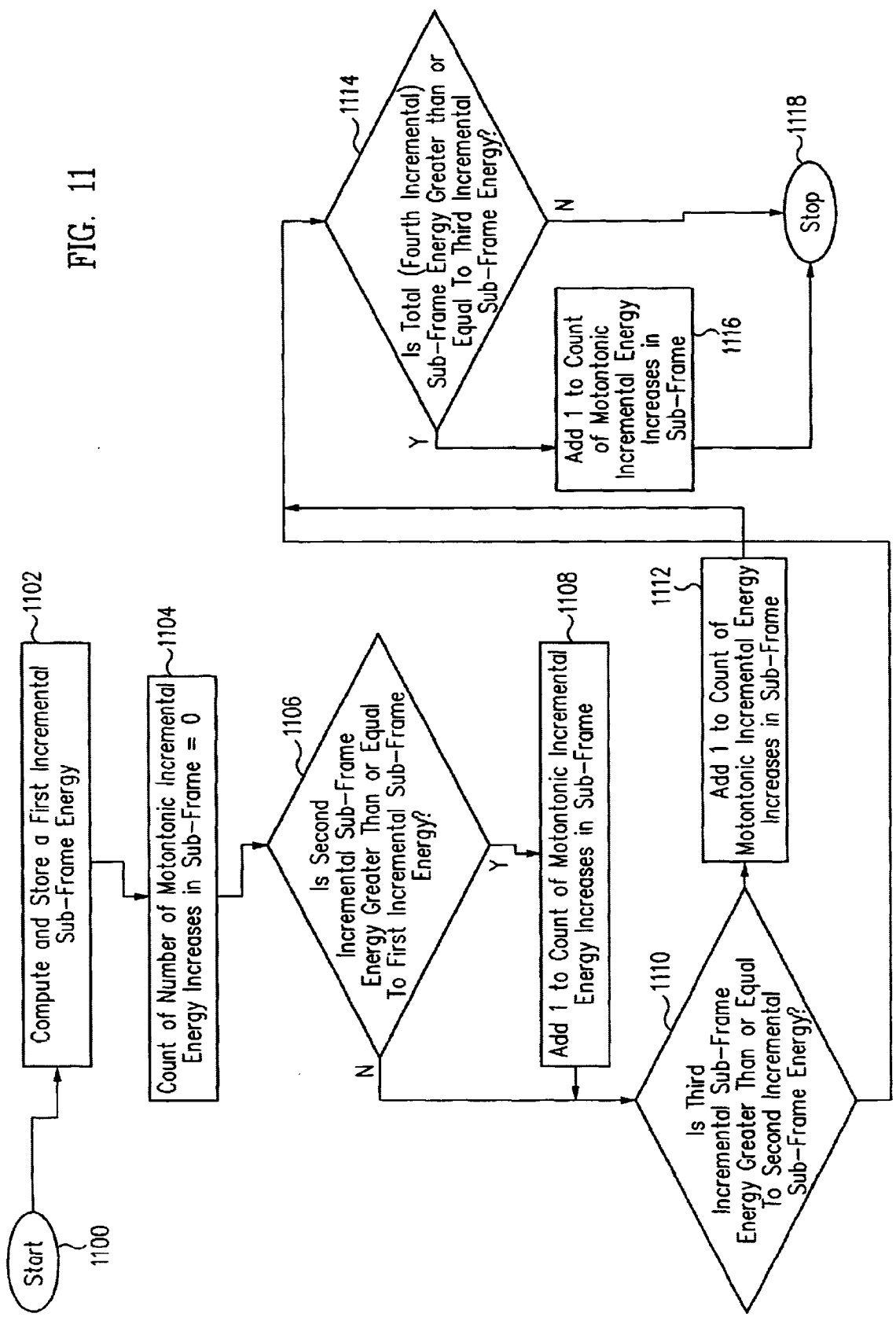
FIG. 11 is a high-level logic flowchart depicting how one embodiment of the present invention determines monotonic incremental energy increases within one sub-frame.

Referring now to FIG. 11, shown is high-level logic flowchart of the process whereby one embodiment of the present invention determines the number of incremental sub-frame energy increases. The process demonstrated in FIG. 11 is substantially equivalent to the process demonstrated in FIG. 10, except that the process in FIG. 11 is for sub-frames. Consequently, the discussion of this process will not be re-engaged in here for the sake of brevity, since it would be substantially similar to that just engaged in for FIG. 10.

Figure 12:
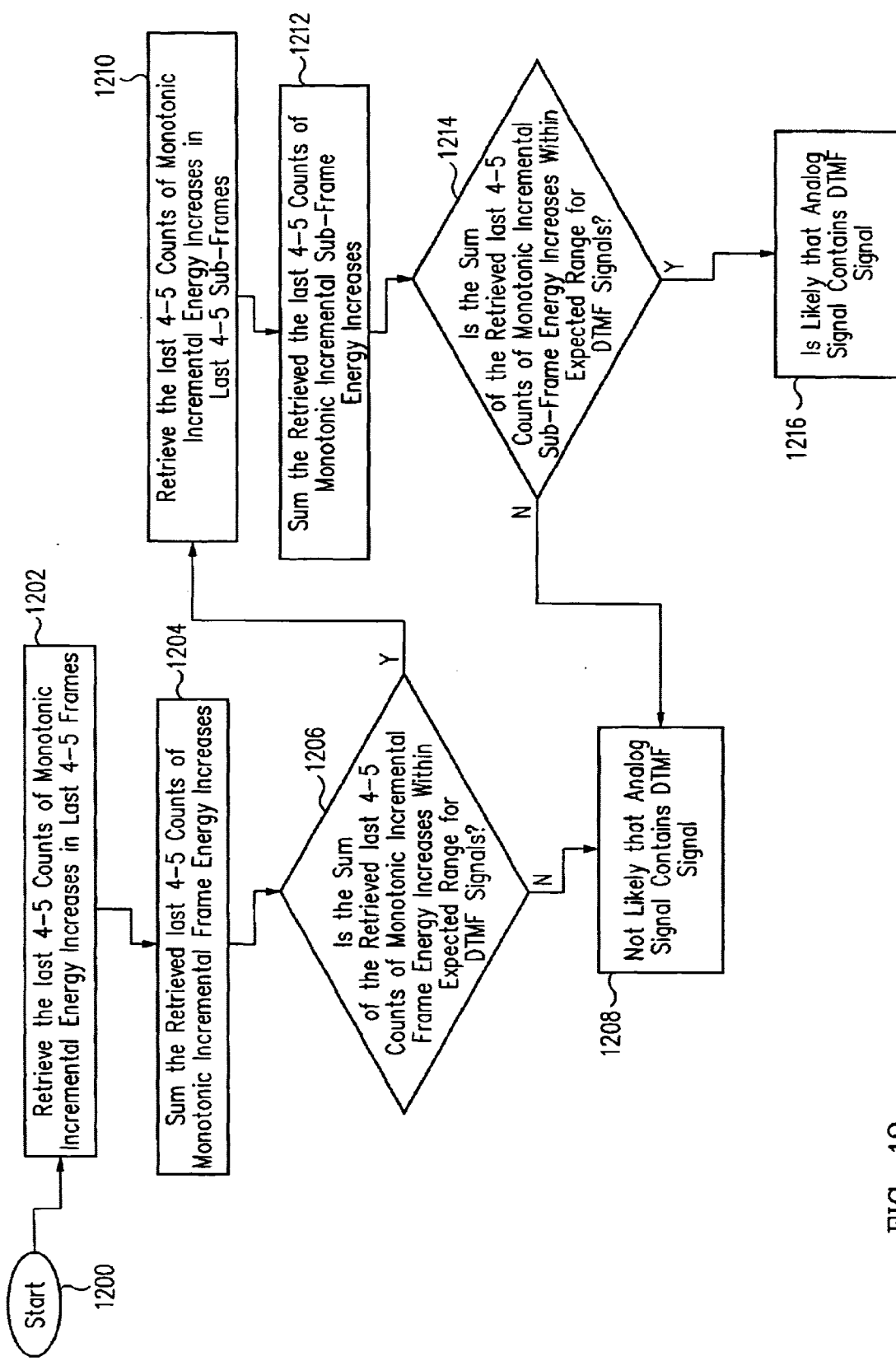
FIG. 12 is a high-level logic flowchart depicting how one embodiment of the present invention gives a confidence estimate regarding the likelihood of receiving a specific signal.

With reference now to FIG. 12, which is a high-level logic flowchart depicting how one embodiment of the present invention gives a confidence estimate utilizing the count of monotonic incremental increases in frames and/or sub-frames, method step 1200 illustrates the start of the process. Method step 1202 shows that the last 4 or 5 Counts of Monotonic Incremental Increases in the last 4 or 5 frames are retrieved (as illustrate in relation to FIG. 8, the signals in the 2130/2750 Hz environment can span as few as 4 and as great as 5 frames). Method step 1204 depicts that the retrieved monotonic incremental frame energy increases are summed. Thereafter, method step 1206 illustrates that sum of the monotonic incremental frame energy increases is compared to an expected range for DTMF signals (the range is determined and set by the system designer empirically).

If the sum of the monotonic incremental frame energy increases is not within the expected range for DTMF signals, the process proceeds to method step 1208 wherein is shown that a message that the presence of a DTMF signal is not likely is output. However, if the sum of the monotonic incremental frame energy increases is within the expected range for DTMF signals, the process proceeds to method step 1210 and retrieves the last 4–5 counts of monotonic incremental energy increases in the last 4–5 sub-frames. Method step 1212 depicts that the retrieved monotonic incremental sub-frame energy increases are summed. Thereafter, method step 1214 illustrates that sum of the monotonic incremental sub-frame energy increases is compared to an expected range for DTMF signals (the range is determined and set by the system designer empirically).

If the sum of the monotonic incremental sub-frame frame energy increases is not within the expected range for DTMF signals, the process proceeds to method step 1208 wherein is shown that a message that the presence of a DTMF signal is not likely is output. However, if the sum of the monotonic incremental frame energy increases is within the expected range for DTMF signals, the process proceeds to method step 1216 wherein is shown that a message that the presence of a DTMF signal is likely is output.

The foregoing has described embodiments of the present invention methodically. Following are specific examples demonstrating calculations utilized by the dual-frequency embodiment of the present invention to increase the accuracy in determining whether a DTMF signal is actually present.

EXAMPLE 1

As has been discussed above, in the dual frequency embodiment the frame energies are calculated at 3 additional values of N giving intermediate energy values for each of the 4 frames which are used to differentiate tone energies from those produced by speech present in the input signal. The N and k values used for these intermediate points are tabulated below in Table 2:

TABLE 2

| f (tone) | N value | k value (float) | k value (integer) | absolute error e(k) | coefficient |
|---|---|---|---|---|---|
| 2130.0 | 45 | 11.98125 | 12 | 0.01875 | −0.209056926 |
|  | 79 | 21.03375 | 21 | 0.03375 | −0.198507597 |
|  | 124 | 33.015 | 33 | 0.015 | −0.202336644 |
| 2750.0 | 41 | 14.09375 | 14 | 0.09375 | −1.087135100 |
|  | 96 | 33.0 | 33 | 0.00 | −1.111140466 |
|  | 125 | 42.96875 | 43 | 0.03125 | −1.113751233 |

An examination of the final coefficients for each tone shows that, although these coefficients are not exactly the same for each intermediate & final energy calculation, they are within a very small percentage error. Thus, a single coefficient for each tone can be used to calculate the intermediate energy values without any serious loss of accuracy. This coefficient is chosen to be the one used to calculate the final energies. Since the 2750 Hz tone uses less samples to calculate the final frame energy, a normalization of this final energy value is required so that energy comparisons for the 2130 and the 2750 Hz tone are meaningful. This is achieved by multiplying the final 2750 frame energy by the factor:

$$(169/160)^2 = 1.115664063$$

The outcome of employing this intermediate energy calculation are utilized in all subsequently discussed examples.

Figure 13:
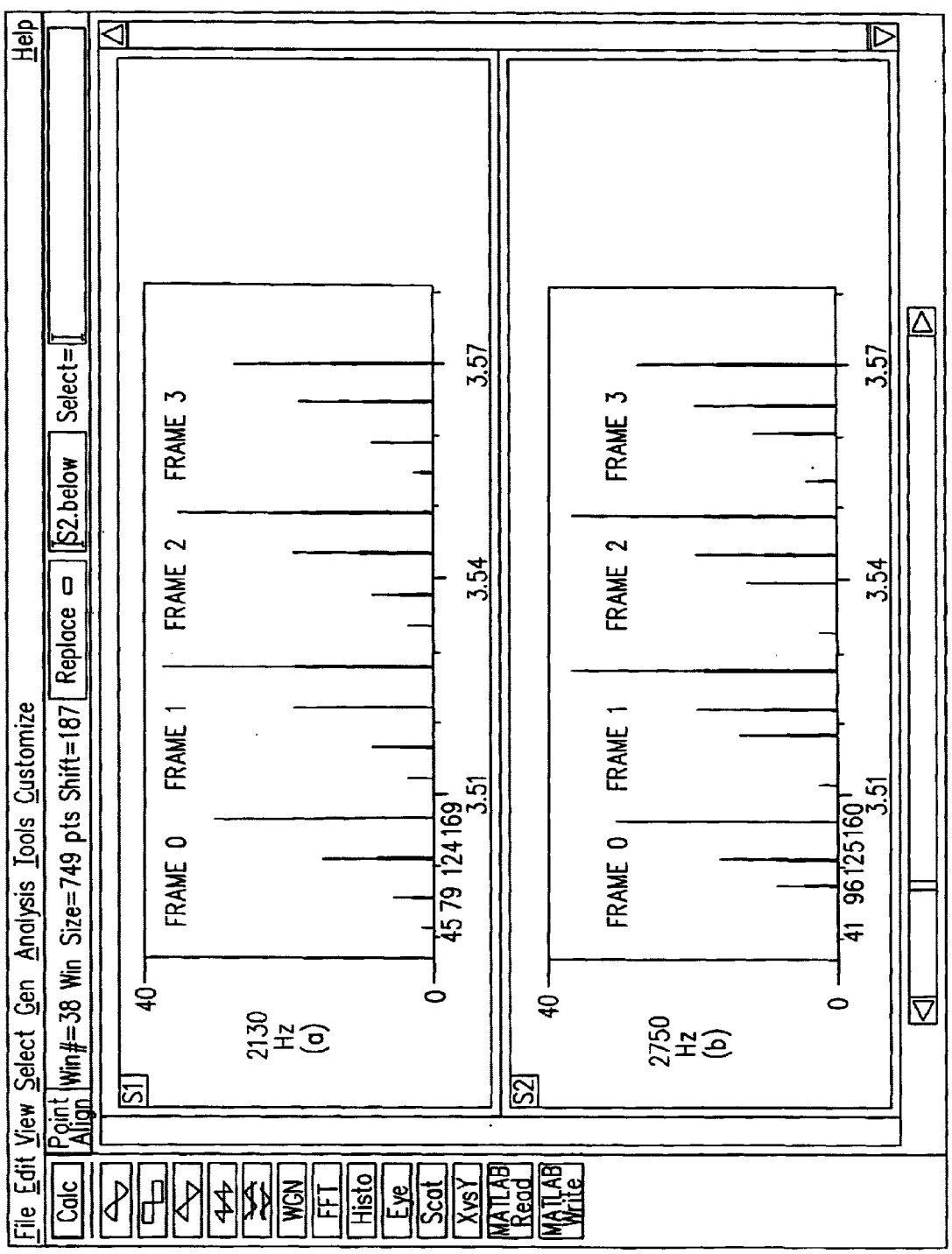
FIG. 13 is a screen capture of a simulation of an embodiment of the present invention.

With reference now to FIG. 13, which is a screen capture of a simulation of an embodiment of the present invention, shown are frame and sub-frame interval energies. In the simulation, the input signal to the detector was a CAS tone at −32 dBm with a duration of 80 ms, or 640 samples at 8 kHz sampling rate. It can be clearly seen that, for every frame and sub-frame, there is a linear increase in energy at 45, 79, 124 and 169 sample counts for the 2130 Hz tone and at 41, 96, 125 and 160 sample count for the 2750 Hz tone. Note that, although the final energy calculation for the 2750 tone is done at sample count 160, it is displayed at sample count 169 for consistency with the 2130 Hz final energy calculation. The detection scheme counts the number of linearly increasing energy values by using the energy value at sample 41 and 45 (for the 2750 and 2130 Hz tones respectively) as the reference value and comparing the value calculated at 79, 124 & 169 (for the 2130 Hz tone) and 79, 125 & 160 (for the 2750 Hz tone). In this particular case, and because there is no speech or noise present, each frame and sub-frame have 3 consecutive energy increases giving a total of 12 energy-increase counts for the total duration of the CAS tone.

For a well-conditioned signal like that previously described, the energy-increase counts seem rather superfluous since the final energy values are very consistent frame to frame and tone to tone. Note that the final energy values for frames/sub-frames 0 and 3 are slightly lower than for frames/sub-frames 1 and 2: this is because the number of tone samples (not to indicate that the number of samples is less than 169; rather, that some of the samples indicate substantially zero energy for the tone in question) in the start and ending frame are less than 169 (i.e., they are partial frames), so their energy content will be proportionately lower.

EXAMPLE 2

Referring now to FIGS. 14A, 14B, and 14C, which are a screen captures of a simulation of an embodiment of the present invention, shown are frame and sub-frame interval energies. Example 2 illustrates the usefulness of the energy-increase counts when the detector is running in the presence of speech only. Here, the simulated speech level is −12 dBm and FIG. 14A shows that the speech is at a moderately high level. FIGS. 14B and 14C are the energy outputs from the 2130 Hz and 2750 Hz detectors respectively.

In FIG. 14C, it can be seen that sub-frame (−1) of the 2750 detector indicates that this could be the start sub-frame of a possible CAS tone: the final sub-frame energy is high and it has 3 linearly increasing energy values at 96, 125 and 160 samples. However, the absence of energy in the 2130 detector disallows this sub-frame since both tones must be present simultaneously and meet the power differential of +/−6 dBs between the tones. However, if one examines the next 4 sub-frames, use of the final sub-frame energies in conjunction with the power differential measure would result in the detector detecting the presence of a CAS signal. The actual figures for each frame/sub-frame are given below in Table 3:

TABLE 3

| Frame or Sub-Frame # | 2130 Hz energy | 2750 Hz energy | tone power differential |
|---|---|---|---|
| 0 | 18 | 24 | −1.25 dB |
| 1 | 21 | 22 | −0.20 dB |
| 2 | 19 | 6 | 5.00 dB |
| 3 | 4 | 4 | 0.00 dB |

The only suspicious parameter is the high power differential in frame/sub-frame 2 compared to the other frames but it is within the specification. The low energies for the frame/sub-frame 3 could be accounted for by a short duration CAS of 75 ms (600 samples or less) with the final frame as a partial frame less than or equal to 93 samples. This detector, therefore, would have suffered a talk-off detect with the consequent problem described above. One might consider disallowing the detect on the basis of a sub-frame to sub-frame (cross-frame) energy comparison, in which the sub-frame 1 to sub-frame 2 power differential for the 2750 Hz tone is 5.64 dBs. However, using such a measure alone to reject this as a talk-off would make the talk-down performance much poorer since such cross-frame energy dropouts do occur when speech and CAS are present in an input signal simultaneously.

However, if one employs a strategy which uses the linearly increasing frame/sub-frame energy calculations described above to keep an overall energy-increase count for each tone, the following result, shown in Table 4 below, would be obtained:

TABLE 4

| Frame or Sub-Frame# | 2130 Hz energy-increase count | 2750 Hz energy-increase count |
|---|---|---|
| 0 | 3 | 2 |
| 1 | 3 | 2 |
| 2 | 3 | 0 |
| 3 | 2 | 2 |
| total | 11 | 6 |

Therefore, although the 2130 Hz detector indicates the continuous presence of energy for 3–4 frames, the 2750 detector only indicates half of the count normally expected when a tone is present continuously. Employing this count and the sub-frame 1 to sub-frame 2 power differential for the 2750 Hz tone, one can reject this detection with greater confidence. In consequence, the detector demonstrates improved talk-off performance.

For the case of talk-down, the use of the energy increase count to indicate the strong presence of a CAS tone which has been masked by the presence of high energy speech allows tones to be detected in this adverse environment. Single cross-frame energy dropouts do occur but the overall energy-increase count has been measured at 9 or greater for the duration of CAS tones in the presence of speech which allows the detection of the tones to be completed successfully even when an energy dropout has occurred.

EXAMPLE 3

Examination of FIGS. 15A and 15B, which are a screen captures of a simulation of an embodiment of the present invention, shown are frame and sub-frame interval energies. These figures illustrate the usefulness of these energy-increase counts when the detector is detecting a CAS tone in the presence of moderately high speech levels. Again, the speech signal level is −12 dBm, as in FIG. 14A. In FIG. 15A, it can be seen that the final energy detection for the 2130 Hz tone in frame 3 is negligible and, in consequence, the power differential of +/−6 dBs between the tones is not met. Also, the power differential in frame 1 is also outside the required value. Since the energy outputs from the detector should be the same as those in FIG. 13, where the input signal to the detector was a CAS tone at −32 dBm with a duration of 80 ms, it can be seen that the presence of speech has disrupted the detection process. The actual figures for the detector are shown in Table 5 below:

TABLE 5

| Frame or Sub-Frame # | 2130 Hz energy | 2750 Hz energy | tone power differential |
|---|---|---|---|
| 0 | 32 | 40 | −0.97 dB |
| 1 | 35 | 144 | −6.14 dB |
| 2 | 109 | 80 | 1.34 dB |
| 3 | 4 | 94 | −13.71 dB |

Thus, if the final frame/sub-frame energies from each of the 4 frames/sub-frames and their power differential were used as criteria for a detection, this CAS tone would have been rejected as not meeting the basis for detection and a talk-down would have occurred. However, if one employs a similar strategy to that in the talk-off case described above, which uses the linearly increasing frame/sub-frame energy calculations to keep an overall energy-increase count for each tone, the following result, shown in Table 6 below, would be obtained:

TABLE 6

| Frame # | 2130 Hz energy-increase count | 2750 Hz energy-increase count |
| --- | --- | --- |
| 0 | 3 | 3 |
| 1 | 3 | 3 |
| 2 | 3 | 3 |
| 3 | 1 | 2 |
| total | 10 | 11 |

This result indicates the continuous presence of a CAS tone for 3 consecutive frames/sub-frames with an energy dropout in the 4th frame of the 2130 Hz tone. If one uses a low-pass filter to detect the presence of speech in the input signal (this filter should have a pass band from 0–2 kHz and a stop band above 2 kHz, which rejects the CAS tones), this would allow the detector to recognize that speech may be disrupting the detection of the CAS tones and allow the detection criteria in the presence of speech, to be relaxed. Employing the energy increase count, in addition to allowing a single energy dropout and a less stringent power differential test, would allow the detector to report a valid detection in this example. In consequence, the detector demonstrates an improved talk-down performance.

Although the application described is specific, such techniques can be used to improve the talk-off and talk-down performance of audio band tone detectors for other, similar applications.

The foregoing detailed description set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention is implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method for frequency detection, said method comprising:

receiving an analog signal;

creating a stream of data samples from the analog signal; and calculating a confidence factor regarding a presence of one or more analog frequencies within the analog signal on the basis of the stream of data samples utilizing at least two calculated incremental frame energies, wherein said calculating a confidence factor comprises calculating a base frequency confidence factor regarding a presence of a base frequency selected from the one or more analog frequencies, and wherein said calculating a base frequency confidence factor comprises calculating the base frequency confidence factor utilizing a count of monotonic increases in the at least two calculated incremental frame energies.

2. The method of claim 1, wherein said calculating the base frequency confidence factor utilizing at least two calculated incremental frame energies further comprises:

calculating one or more differences between the at least two calculated incremental frame energies; and calculating the base frequency confidence factor utilizing the one or more differences between the at least two calculated incremental frame energies.

3. The method of claim 2, wherein said calculating one or more differences in incremental energies for at least one frame further comprises:

subtracting a first incremental energy from a second incremental energy.

4. The method of claim 3, wherein said subtracting a first incremental energy from a second incremental energy further comprises:

calculating the first incremental energy cumulative upon a sample received at a first time; and calculating the second incremental energy cumulative upon a sample received at a second time subsequent to the first time.

5. The method of claim 4, wherein said calculating the first incremental energy cumulative upon a sample received at a first time further comprises:

calculating the first incremental energy by utilizing the Goertzel Algorithm.

6. The method of claim 4, wherein said calculating the second incremental energy cumulative upon a sample received at a second time subsequent to the first time further comprises:

calculating the second incremental energy by utilizing the Goertzel Algorithm.

7. A method for frequency detection, said method comprising:

receiving an analog signal;

creating a stream of data samples from the analog signal; and calculating a confidence factor regarding a presence of one or more analog frequencies within the analog signal on the basis of the stream of data samples utilizing at least two calculated incremental frame energies;

wherein said calculating the frequency confidence factor utilizing at least two calculated incremental frame energies further comprises:

calculating one or more differences between the at least two calculated incremental frame energies; and calculating the frequency confidence factor utilizing the one or more differences between the at least two calculated incremental frame energies.

8. The method of claim 7, wherein said calculating one or more differences in incremental energies for at least one frame further comprises:

subtracting a first incremental energy from a second incremental energy.

9. The method of claim 8, wherein said subtracting a first incremental energy from a second incremental energy further comprises:
calculating the first incremental energy cumulative upon a sample received at a first time; and
calculating the second incremental energy cumulative upon a sample received at a second time subsequent to the first time.

10. The method of claim 9, wherein said calculating the first incremental energy cumulative upon a sample received at a first time further comprises:
calculating the first incremental energy by utilizing the Goertzel Algorithm.

11. The method of claim 9, wherein said calculating the second incremental energy cumulative upon a sample received at a second time subsequent to the first time further comprises:
calculating the second incremental energy by utilizing the Goertzel Algorithm.

12. A method for frequency detection, said method comprising:
receiving an analog signal;
creating a stream of data samples from the analog signal; and
calculating a confidence factor regarding a presence of one or more analog frequencies within the analog signal on the basis of the stream of data samples utilizing at least two calculated incremental frame energies; wherein
said calculating a confidence factor comprises calculating a second frequency confidence factor regarding a presence of a second frequency selected from the one or more analog frequencies;
said calculating a second frequency confidence factor comprises calculating the second frequency confidence factor utilizing at least two calculated incremental second-frequency sub-frame energies; and
said calculating the second frequency confidence factor utilizing at least two calculated incremental second-frequency sub-frame energies further comprises:
calculating one or more differences between the at least two calculated incremental second-frequency sub-frame energies; and
calculating the second-frequency confidence factor utilizing the one or more differences between the at least two calculated incremental second-frequency sub-frame energies.

13. The method of claim 12, wherein said calculating one or more differences between the at least two calculated incremental second-frequency sub-frame energies further comprises:
subtracting a first second-frequency sub-frame incremental energy from a second second-frequency sub-frame incremental energy.

14. The method of claim 13, wherein said subtracting a first second-frequency sub-frame incremental energy from a second second-frequency sub-frame incremental energy further comprises:
calculating the first incremental second-frequency sub-frame energy cumulative upon a sample received at a first time; and
calculating the second second-frequency sub-frame incremental energy cumulative upon a sample received at a second time subsequent to the first time.

15. The method of claim 14, wherein said calculating the first incremental second-frequency sub-frame energy cumulative upon a sample received at a first time further comprises:
calculating the first incremental second-frequency sub-frame energy by utilizing the Goertzel Algorithm.

16. The method of claim 14, wherein said calculating the second second-frequency sub-frame incremental energy cumulative upon a sample received at a second time subsequent to the first time further comprises:
calculating the second second-frequency sub-frame incremental energy by utilizing the Goertzel Algorithm.

17. A method for frequency detection, said method comprising:
receiving an analog signal;
creating a stream of data samples from the analog signal;
calculating a confidence factor regarding a presence of one or more analog frequencies within the analog signal on the basis of the stream of data samples utilizing at least two calculated incremental frame energies; and
calculating a confidence factor based upon the calculated confidence factor regarding the presence of one or more analog frequencies within the analog signal, wherein at least one of the steps of calculating a confidence factor includes at least one step from the group consisting of:
utilizing a count of monotonic increases in the at least two calculated incremental frame energies; and
utilizing one or more differences between the at least two calculated incremental frame energies.

18. A system for frequency detection, said system comprising:
means for receiving an analog signal;
means for creating a stream of data samples from the analog signal; and
means for calculating a confidence factor regarding a presence of one or more analog frequencies within the analog signal on the basis of the stream of data samples utilizing at least two calculated incremental frame energies;
wherein said means for calculating a confidence factor regarding a presence of one or more analog frequencies within the analog signal on the basis of the stream of data samples further comprises means for calculating a base frequency confidence factor regarding the presence of a base frequency selected from the one or more analog frequencies;
wherein said means for calculating a base frequency confidence factor regarding the presence of a base frequency selected from the one or more analog frequencies further comprises:
means for calculating the base frequency confidence factor utilizing depending upon whether the at least two calculated incremental frame energies are monotonically increasing over a set of the at least two calculated incremental frame energies.

19. A system for frequency detection, said system comprising:
means for receiving an analog signal;
means for creating a stream of data samples from the analog signal; and
means for calculating a confidence factor regarding a presence of one or more analog frequencies within the analog signal on the basis of the stream of data samples utilizing at least two calculated incremental frame energies; wherein
said means for calculating the frequency confidence factor utilizing at least two calculated incremental frame energies further comprises:

means for calculating one or more differences between the at least two calculated incremental frame energies; and means for calculating the frequency confidence factor utilizing the one or more differences between the at least two calculated incremental frame energies.

20. The system of claim 19, wherein said means for calculating one or more differences in incremental energies for at least one frame further comprises:

means for subtracting a first incremental energy from a second incremental energy.

21. The system of claim 20, wherein said means for subtracting a first incremental energy from a second incremental energy further comprises:

means for calculating the first incremental energy cumulative upon a sample received at a first time; and means for calculating the second incremental energy cumulative upon a sample received at a second time subsequent to the first time.

22. The system of claim 21, wherein said means for calculating the first incremental energy cumulative upon a sample received at a first time further comprises:

means for calculating the first incremental energy by utilizing the Goertzel Algorithm.

23. The system of claim 21, wherein said means for calculating the second incremental energy cumulative upon a sample received at a second time subsequent to the first time further comprises:

means for calculating the second incremental energy by utilizing the Goertzel Algorithm.

24. A system for frequency detection, said system comprising:

means for receiving an analog signal;

means for creating a stream of data samples from the analog signal; and means for calculating a confidence factor regarding a presence of one or more analog frequencies within the analog signal on the basis of the stream of data samples utilizing at least two calculated incremental frame energies; wherein said means for calculating the confidence factor comprises means for calculating a second frequency confidence factor regarding a presence of a second frequency selected from the one or more analog frequencies;

said means for calculating the second frequency confidence factor comprises means for calculating the second frequency confidence factor utilizing at least two calculated incremental second-frequency sub-frame energies; and said means for calculating the second frequency confidence factor utilizing at least two calculated incremental second-frequency sub-frame energies further comprises:

means for calculating one or more differences between the at least two calculated incremental second-frequency sub-frame energies; and means for calculating the second-frequency confidence factor utilizing the one or more differences between the at least two calculated incremental second-frequency sub-frame energies.

25. The system of claim 24, wherein said means for calculating one or more differences between the at least two calculated incremental second-frequency sub-frame energies further comprises:

means for subtracting a first second-frequency sub-frame incremental energy from a second second-frequency sub-frame incremental energy.

26. The system of claim 25, wherein said means for subtracting a first second-frequency sub-frame incremental energy from a second second-frequency sub-frame incremental energy further comprises:

means for calculating the first incremental second-frequency sub-frame energy cumulative upon a sample received at a first time; and means for calculating the second second-frequency sub-frame incremental energy cumulative upon a sample received at a second time subsequent to the first time.

27. The system of claim 26, wherein said means for calculating the first incremental second-frequency sub-frame energy cumulative upon a sample received at a first time further comprises:

means for calculating the first incremental second-frequency sub-frame energy by utilizing the Goertzel Algorithm.

28. The system of claim 26, wherein said means for calculating the second second-frequency sub-frame incremental energy cumulative upon a sample received at a second time subsequent to the first time further comprises:

means for calculating the second second-frequency sub-frame incremental energy by utilizing the Goertzel Algorithm.

29. A system for frequency detection, comprising:

means for receiving an analog signal;

means for creating a stream of data samples from the analog signal;

means for calculating a confidence factor regarding a presence of one or more analog frequencies within the analog signal on the basis of the stream of data samples utilizing at least two calculated incremental frame energies; and means for calculating a confidence factor based upon the calculated confidence factor regarding the presence of one or more analog frequencies within the analog signal, wherein at least one of the means for calculating a confidence factor includes at least one of the group consisting of:

means for utilizing a count of monotonic increases in the at least two calculated incremental frame energies; and means for utilizing one or more differences between the at least two calculated incremental frame energies.

* * * * *